US012779692B2

(12) United States Patent
Natarajan et al.

(10) Patent No.: US 12,779,692 B2
(45) Date of Patent: Nov. 3, 2026

(54) POSE ADJUSTMENT TECHNIQUES IN ROBOTIC MANUFACTURING

(71) Applicant: Path Robotics, Inc., Columbus, OH (US)

(72) Inventors: Sabhari Natarajan, Columbus, OH (US); Andrew Lonsberry, Columbus, OH (US); Nima Ajam Gard, Columbus, OH (US); Aditya Jain, Columbus, OH (US); Siddharth Telang, Columbus, OH (US)

(73) Assignee: Path Robotics, Inc., Columbus, OH (US)

( * ) Notice: Subject to any disclaimer, the term of this patent is extended or adjusted under 35 U.S.C. 154(b) by 0 days.

(21) Appl. No.: 19/549,045

(22) Filed: Feb. 25, 2026

(65) Prior Publication Data

US 2026/0183958 A1 Jul. 2, 2026

Related U.S. Application Data

(63) Continuation of application No. PCT/US2024/046088, filed on Sep. 11, 2024.

(Continued)

(51) Int. Cl.

*B25J 9/16* (2006.01)
*B23K 37/02* (2006.01)

(Continued)

(52) U.S. Cl.

CPC ......... *B25J 9/1682* (2013.01); *B23K 37/0229* (2013.01); *B23K 37/0282* (2013.01); *B23K 37/04* (2013.01); *B25J 9/0096* (2013.01)

(58) Field of Classification Search

CPC ............ B23K 37/0229; B23K 37/0282; B23K 37/04; B25J 9/0096; B25J 9/1682

See application file for complete search history.

(56) References Cited

U.S. PATENT DOCUMENTS

| | | | | |
|---|---|---|---|---|
| 10,981,272 | B1 * | 4/2021 | Nagarajan | B25J 9/1669 |
| 2002/0072825 | A1 | 6/2002 | Angel | |

(Continued)

FOREIGN PATENT DOCUMENTS

| | | | |
|---|---|---|---|
| WO | 2023205209 | A1 | 10/2023 |

OTHER PUBLICATIONS

International Search Report and Written Opinion mailed on Dec. 19, 2024, issued in International Application No. PCT/US2024/046088 filed on Sep. 11, 2024; 11 pages.

*Primary Examiner* — Blake A Wood

(74) *Attorney, Agent, or Firm* — IPkey PLLC

(57) ABSTRACT

A robotic manufacturing system includes at least one first robot arm positioned in a manufacturing cell, a second robot arm coupled to a manufacturing tool and also located within the manufacturing cell. The system includes a pose adjustment station and a manufacturing station inside the cell. A controller is connected to both robot arms and includes a processor and memory storing instructions. When executed by the processor, the instructions cause the system to perform operations including grasping objects with the first robot arm in various initial poses from the highly unstructured storage environment, transferring the objects to the relatively structured pose adjustment station for regrasping in a common adjusted grasp pose that facilitates downstream manufacturing operations. The system then regrasps the objects in the adjusted grasp pose(s) and performs manufacturing and manufacturing operations. The introduction of the pose adjustment station significantly reduces overall weld cycle time.

20 Claims, 5 Drawing Sheets

Related U.S. Application Data

(60) Provisional application No. 63/581,898, filed on Sep. 11, 2023.

(51) Int. Cl.
*B23K 37/04* (2006.01)
*B25J 9/00* (2006.01)

(56) References Cited

U.S. PATENT DOCUMENTS

| | | | | |
|---|---|---|---|---|
| 2007/0032905 | A1 | 2/2007 | Nagatsuka et al. | |
| 2009/0249606 | A1 | 10/2009 | Diez et al. | |
| 2014/0017048 | A1* | 1/2014 | Mattern | B25J 9/0084 414/730 |
| 2014/0152036 | A1* | 6/2014 | Karl | F16B 5/065 296/29 |
| 2015/0352717 | A1* | 12/2015 | Mundt | B25J 19/021 414/730 |
| 2018/0173208 | A1* | 6/2018 | Lee | G05B 19/4189 |
| 2019/0134753 | A1* | 5/2019 | Gartner | B66B 23/00 |
| 2019/0331480 | A1 | 10/2019 | Lonsberry et al. | |
| 2020/0262079 | A1 | 8/2020 | Saez et al. | |
| 2022/0016776 | A1 | 1/2022 | Lonsberry et al. | |
| 2022/0266453 | A1 | 8/2022 | Lonsberry et al. | |
| 2022/0305593 | A1 | 9/2022 | Lonsberry et al. | |
| 2022/0314437 | A1* | 10/2022 | Gienger | B25J 9/0087 |
| 2022/0379477 | A1* | 12/2022 | Albrecht | B25J 13/08 |
| 2023/0123712 | A1 | 4/2023 | Lonsberry et al. | |
| 2023/0173676 | A1 | 6/2023 | Lonsberry et al. | |
| 2023/0278224 | A1 | 9/2023 | Bunker et al. | |
| 2023/0302590 | A1 | 9/2023 | Lien et al. | |
| 2023/0330764 | A1 | 10/2023 | Ott et al. | |
| 2023/0381976 | A1* | 11/2023 | Kimura | B25J 15/08 |
| 2023/0390876 | A1 | 12/2023 | Kaldy et al. | |
| 2023/0403475 | A1 | 12/2023 | Huang et al. | |
| 2024/0009852 | A1 | 1/2024 | Lien et al. | |
| 2024/0042614 | A1 | 2/2024 | Schwenker et al. | |
| 2024/0246164 | A1 | 7/2024 | Balajepalli et al. | |
| 2024/0246179 | A1 | 7/2024 | Candadai Vasu et al. | |
| 2025/0018571 | A1 | 1/2025 | Sood et al. | |
| 2025/0153261 | A1 | 5/2025 | Vasu et al. | |
| 2026/0091837 | A1* | 4/2026 | Jung | B62D 65/026 |

* cited by examiner

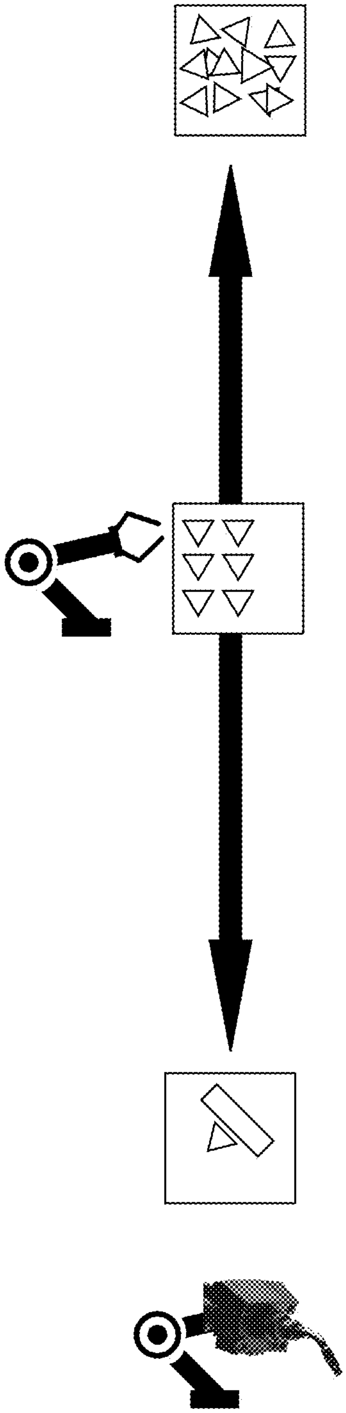
FIG. 3B
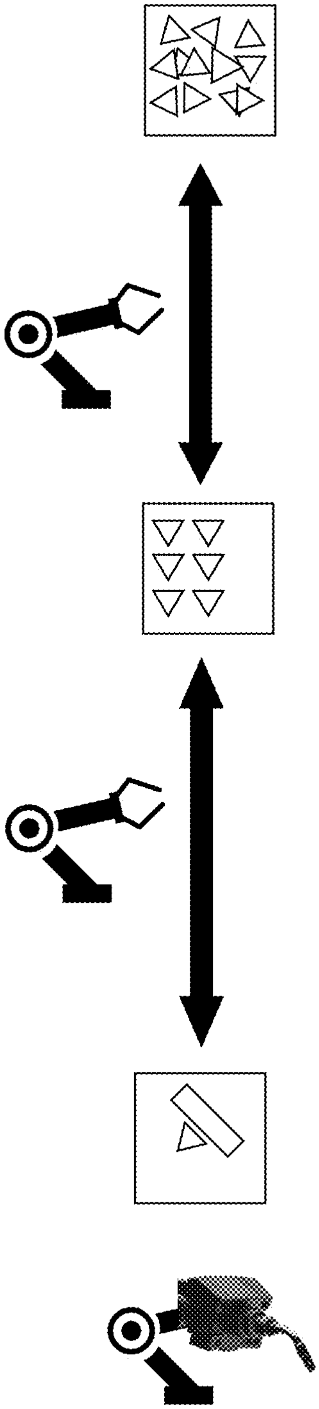
FIG. 3C
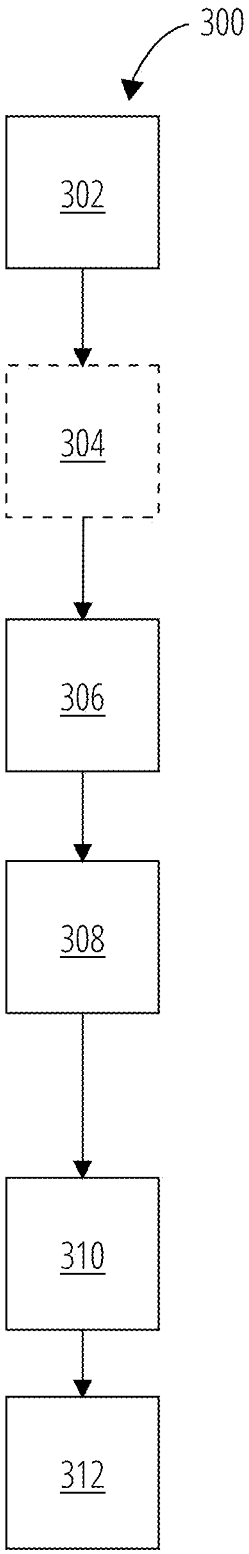

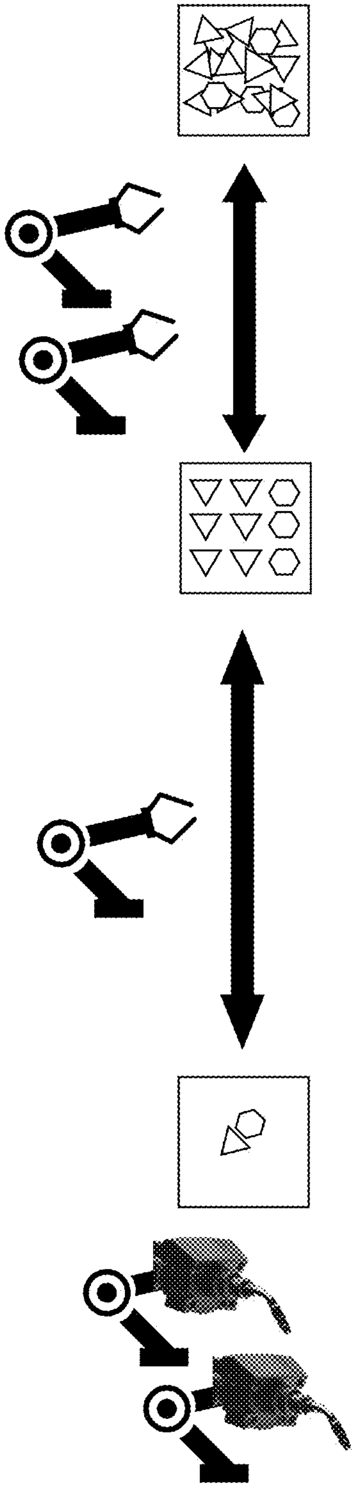
FIG. 3D
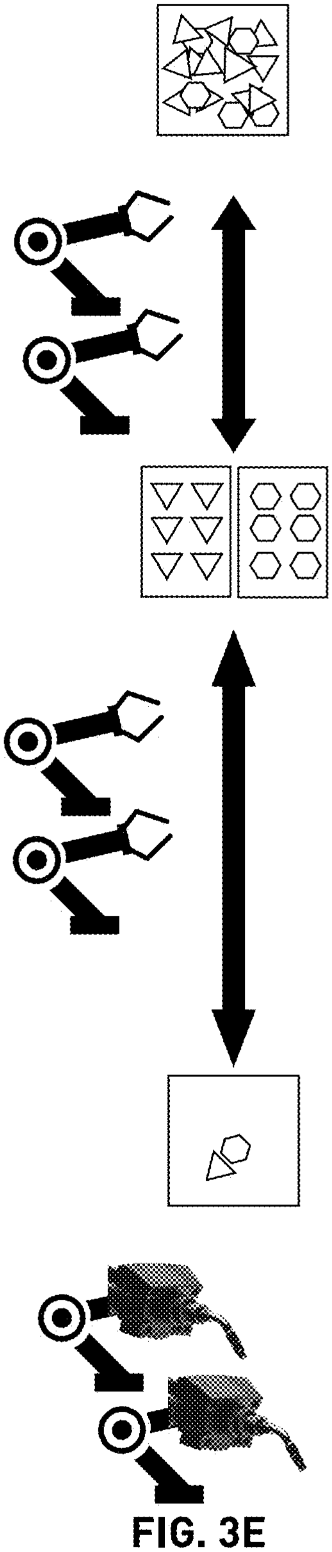
FIG. 3E
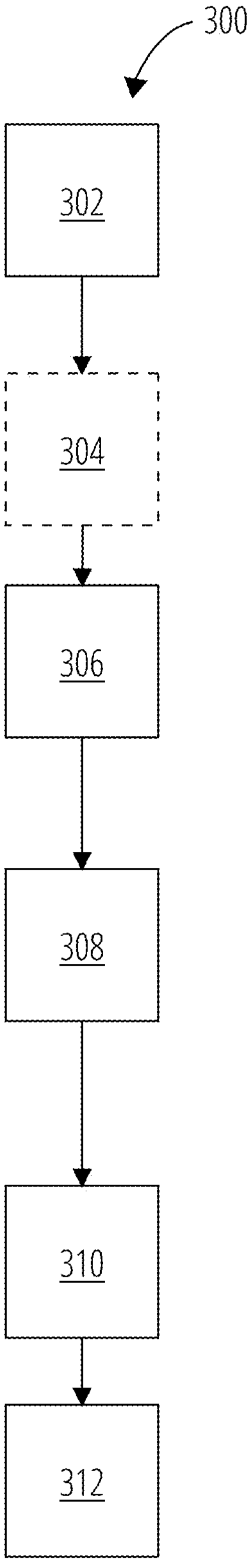

POSE ADJUSTMENT TECHNIQUES IN ROBOTIC MANUFACTURING

CROSS REFERENCE TO RELATED APPLICATIONS

This patent application is a Track One United States bypass continuation of International Application No. PCT/US24/46088, filed on Sep. 11, 2024, which claims the benefit under 35 U.S.C. 119 of U.S. provisional patent application No. 63/581,898, filed Sep. 11, 2023, the entire disclosure of which is hereby incorporated by reference in entirety.

TECHNICAL FIELD

This disclosure relates to robotic welding. Specifically, this disclosure relates to pose adjustment techniques and systems that make robotic welding more efficient.

BACKGROUND

In the field of industrial robotics, there is a growing trend towards using robots with object-grasping end effectors, particularly in manufacturing applications. These robots are configured to grasp from one position and place the objects in another position for various tasks. When the task involves welding, however, a significant challenge arises: ensuring that the objects are precisely oriented and positioned relative to one another to form an accurate seam (e.g., a seam that results in correct joining/welding of the objects).

To illustrate, when a robot arm grasps an object from a designated area (e.g., a storage bin or feeder system), it does so based on the pose (i.e., position and orientation) in which the object is placed in the storage (referred to herein as "initial resting pose"). However, the initial resting pose of the object may impede the robot from grasping the object in an "grasp pose" (how and where the robot grasps the object) in such a way that enables pre-welding operations (e.g., placement, alignment, insertion, etc.), and ultimately impedes the robot from accurately bringing the object into a spatial relationship with another object such that a weldable seam accurately forms at their interface.

To further illustrate, if the picked up object is placed on a welding station (e.g., the positioner on which welding takes place), the initial resting pose of the object in storage restricts the way in which the picked up object is settled on the welding station. The same goes for other picked up objects of the same welded assembly—that is, its initial resting pose restricts the way in which the object could be settled on the welding station relative to the other, already placed, object. This can lead to situations where the objects, once placed, fail to achieve the alignment to accurately form an unwelded seam. In other words, the discrepancy can lead to situations where an accurate weldable seam either cannot be formed or is poorly formed.

Furthermore, after the initial pick-up of the objects, bringing the picked up objects into a spatial relationship with each other such that a weldable seam is formed between them is a complex and computationally-intensive task. Given the variability in initial resting poses of objects in storage (even objects having a uniform characteristics)—and thus variability in the initial grasp poses—estimating settling poses of the picked-up objects on the welding station can introduce significant delays, consuming computational resources and negatively impacting overall cycle times and production throughput.

SUMMARY

The present disclosure accelerates robotic welding operations by utilizing an intermediate "pose adjustment station." According to the methods and systems described herein, one or more robot arms pick the object(s) from the storage in various initial grasp poses and transfer the object(s) to the pose adjustment station, where the robot arm(s) release and regrasp the object(s) in an adjusted grasp pose. The adjusted grasp pose facilitates pre-welding operations and welding operations by grasping the object at a location and in an orientation that enables accurate placement, insertion, and/or orientation of the object relative to one or more workpieces, welding fixtures, etc., in order to form an accurate unwelded seam.

Thereafter, the robot arm(s) transfer the object(s) to the welding station and perform one or more pre-welding operations before a robotic welding tool welds the object(s). Accordingly, the objects are transferred from a highly unstructured state (storage) to a relatively structured state (pose adjustment station) before transference to the welding station (a highly structured state). Because robotic operations between the pose adjustment station and the welding station are highly repeatable, overall cycle time is reduced despite adding an extra step into the automated welding process.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description and is not intended as a definition of the limits of the present disclosure.

BRIEF DESCRIPTION OF THE FIGURES

For a more complete understanding of the present disclosure, reference is now made to the following descriptions taken in conjunction with the accompanying figures, in which:

FIG. 3B illustrates representative examples of robotic welding methods of FIG. 3A.

FIG. 3C illustrates additional representative examples of robotic welding methods of FIG. 3A.

FIG. 3D illustrates additional representative examples of robotic welding methods of FIG. 3A.

FIG. 3E illustrates additional representative examples of robotic welding methods of FIG. 3A.

DETAILED DESCRIPTION

Figure 1:
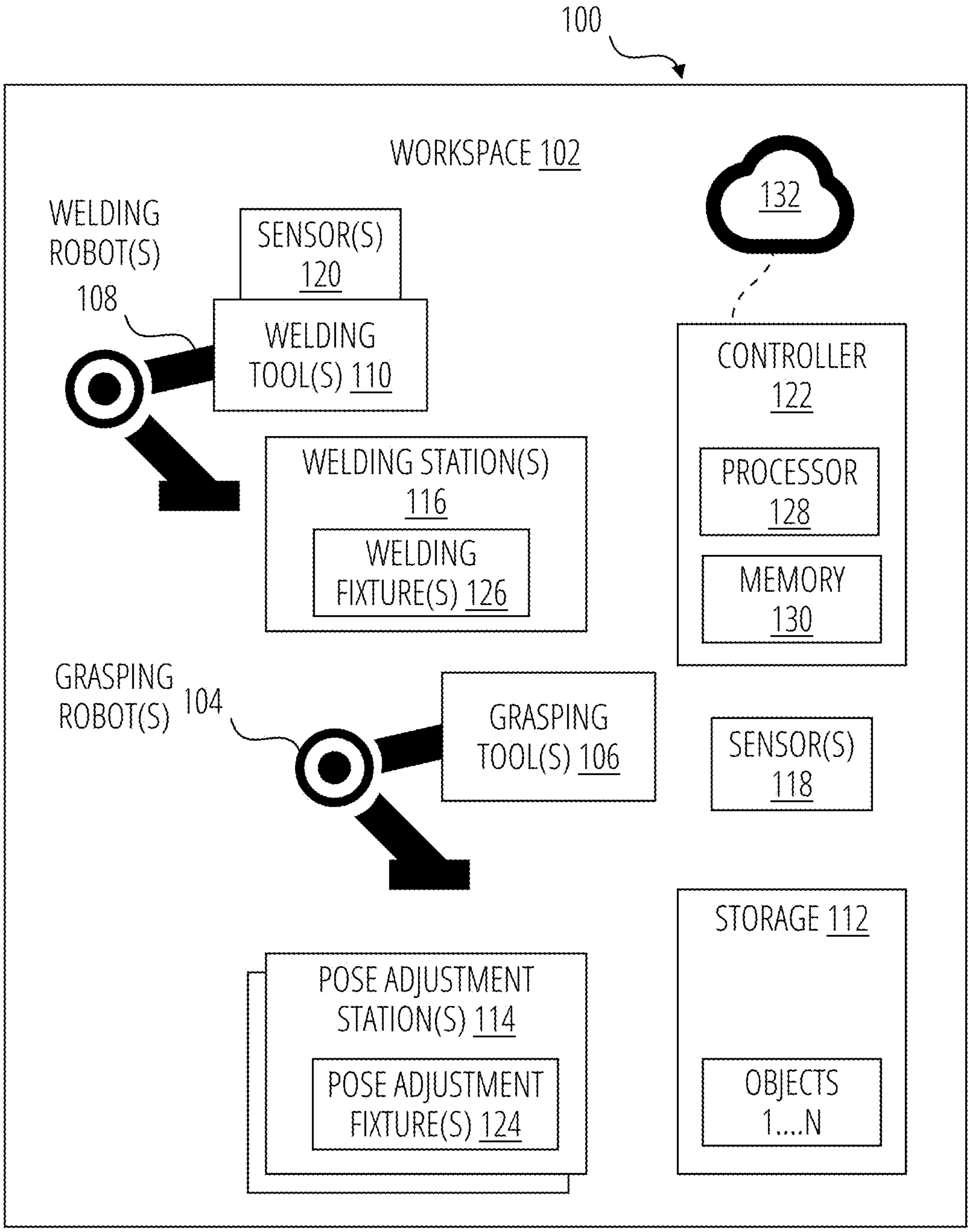
FIG. 1 schematically illustrates a robotic welding system according to the present disclosure.

Referring to FIG. 1, robotic welding system 100 enables techniques for pose adjustment and fixtures-based welding in a robotic manufacturing environment according to one or more aspects. Elements of the robotic welding system 100 will be briefly introduced before describing interrelationships between the elements. Thereafter, representative methods which may be performed by robotic welding system 100, or independently thereof, will be described.

Robotic welding system 100 is positioned in a manufacturing workspace 102 (also referred to herein as a "workspace 102"). In the illustrated embodiment, workspace 102 includes a welding cell that encompasses some or all elements of the robotic welding system 100. Robotic welding system 100 includes one or more grasping robots 104 (first robot arms) each being provided with grasping tools 106 configured to assist with grasping and pre-welding operations. Robotic welding system 100 further includes one or more welding robots 108 (second robot arms) adapted with a welding tool 110. One or more object storages 112 (e.g., bins), one or more pose adjustment stations 114, and one or more welding stations 116 are disposed in the workspace 102 within reach of the grasping robots 104. One or more sensors 118 (e.g., cameras, scanners, etc.) sense operational parameters in the workspace 102 and provide feedback to the processes described herein. Additional sensor 120 (e.g., cameras) are disposed upon the welding robot 108 and sense parameters of the welding operations and/or workspace 102. A controller 122 directs operation of the robot arms according to logical instructions implementing methods according to the present disclosure. In particular, controller 122.

The workspace 102 or welding cell is delimited at its boundary by protective barriers to shield operators from radiation, sparks, and other hazards from welding operations performed therein. In addition to enclosing the grasping robots 104, welding robots 108, storage 112, pose adjustment station 114, welding station 116, and sensors 118, 120, the welding cell may include automated wire feed systems, welding consumables, and other elements of the robotic welding system 100. Some elements of the robotic welding system 100 may be disposed outside the workspace 102, namely the controller 122.

Grasping robot 104 includes one or more robot arms configured to: pick objects of alike or different characteristics from storage 112, transfer the objects to the pose adjustment station 114, place (e.g., set down) the objects on the pose adjustment station 114 (e.g., relative to one or more optional pose adjustment fixtures), regrasp the objects in a common adjusted grasp pose configured to enable one or more pre-welding operations and welding operations, transfer the objects to the welding station 116, and perform one or more pre-welding operations relative to workpieces or welding fixtures such that the objects form a weldable seam. Subsequent to the pre-welding operations, the welding robot 108 welds the unwelded seam.

While the foregoing describes the use of a single grasping robot 104, in some implementations, grasping robot 104 includes two or more distinct robot arms. In such implementations, each robot arm is responsible for picking a respective object and positioning the objects on the pose adjustment station and welding station. The positioning of the objects on the pose adjustment station and welding station may be sequential or parallel. Furthermore, while the foregoing description references the use of a single storage 112 for storing the objects, in some implementations, multiple bins could be employed to store the objects. In such implementations, each bin could house designated objects, and the respective grasping robot(s) could be configured to retrieve objects from the corresponding bins.

Both the grasping robot 104 and the welding robot 108 include a mechanical device, such as a robotic arm. In some implementations, the robotic arm may be configured to have six degrees of freedom (DOF) or greater/fewer than six DOF. The robotic arm may include one or more components, such as a motor, a servo, hydraulics, or a combination thereof, as illustrative, non-limiting examples. In some implementations, robotic arms manufactured by YASKAWA®, ABB® IRB, KUKA®, or Universal Robots® may be employed.

The robotic arm may be coupled to or include one or more tools. Based on the functionality the robot performs, the robot arm can be coupled to a tool configured to enable (e.g., perform at least a part of) the functionality. To illustrate, a tool, such as grasping tool 106 or welding tool 110, may be coupled to an end of the robotic arm. In some implementations, the robotic arm may be coupled to or include multiple tools, such as grasping tool 106 (or welding tool 110), sensors (e.g., force feedback sensor, one or more cameras), or a combination thereof.

Grasping robot 104 includes the above-described robotic arm; the robotic arm is coupled with a grasping tool 106. Grasping tool 106 is configured to be selectively coupled to one or more objects, such as an object that is resting in a storage unit (e.g., storage 112). Stated another way, grasping tool 106 is configured to grasp and change position and/or orientation of a resting object. For example, the grasping tool 106 is configured to grasp an object and place it elsewhere. In some implementations, grasping tool 106 may include or correspond to a gripper, a clamp, a magnet, or a vacuum, as illustrative, non-limiting examples. For example, the grasping tool 106 may include a magnetic gripper, such as one manufactured by OnRobot®. In some implementations, the grasping robot 104, the grasping tool 106, or a combination thereof, may be configured to change (e.g., adjust or manipulate) a pose of an object while the object is coupled to the grasping tool 106. For example a configuration of the grasping robot 104 and/or the grasping tool 106 may be modified to change the pose of the aforementioned object. In some implementations, the grasping robot 104 may be configured to perform the grasping task and/or changing the pose task, responsive to an instruction, such as an instruction received from controller 122.

In some implementations, the grasping robot 104 may be coupled to both a grasping tool (e.g., grasping tool 106) and one or more sensors (e.g., force feedback sensor). The robotic arm of the grasping robot 104 may be coupled—at its attachment point—to one or more sensors (e.g., force feedback sensors), and the grasping tool 106 may be coupled to the one or more sensors. The foregoing coupling arrangement between the arm, sensors, and tool is illustrative. In some examples, the arrangement may be different, for example, the grasping tool 106 may be coupled to the arm via the attachment point while the one or more sensors are coupled to the grasping tool 106. The foregoing one or more sensors may be employed to gauge attributes related to the grasping tool 106. To expand on this—when the object the grasping robot 104 is carrying comes into contact with an entity (like a fixture or a table), the force sensor registers a change. Once contact is made, the controller 122 can continuously monitor the force being applied as the object is slid along the contour of the fixture and/or table. The object could be slid up until a desired distance, or it could be slid up until when the force sensor registers another contact, this time with another pose adjustment fixture, e.g., placed perpendicular to the first pose adjustment fixture. The predefined distance or force feedback may act as a cue for the controller 122 that the object has reached a position where it can safely be dropped off or placed on the pose adjustment station 114. At this point, the object is considered to be in the desired pose for regrasp.

In addition to force feedback, other sensors can also be employed for different purposes, such as positional sensors, which can track the position and orientation of the grasping tool 106, helping to ensure it moves accurately to the intended location. Tactile sensors could also be employed; these sensors can detect the surface texture of an object. This can be useful in differentiating between objects or determining the best grip strategy. Irrespective of the sensor type, the feedback from them can allow the grasping robot 104—while receiving instructions from controller 122—to adapt its actions in real-time.

Welding robot 108 includes the above-described robotic arm and is coupled with the welding tool 110. The welding tool 110 is configured to join/couple two or more objects together using a welding technique (e.g., fusion). For example, the welding tool may be configured to deposit weld metal along a weldable seam to join two objects positioned on the welding station 116. In some implementations, the welding tool may be configured to use heat to join or fuse two or more objects (e.g., by heating them to melting point and forcing their metals to fuse). In some implementations, a combination of deposition of metal and fusion welding may be employed. This disclosure mainly describes the foregoing two kinds of welding, in other implementations, other kinds of welding techniques (e.g., solid state welding where the state of the base object remains substantially solid) may be used.

In some implementations, the welding robot 108 may be coupled to welding tool 110, one or more sensors (e.g., touch sensor, one or more cameras, or a combination thereof). Robotic arm of the welding robot 108 may be coupled to a welding tool 110, one or more sensors 120 (e.g., one or more cameras), or a combination thereof. In some implementations, the attachment point of the robotic arm may attach welding tool 110, while one or more sensors 120 (or housing thereof) may be coupled to the welding tool 110. The foregoing configuration of welding tool 110 and sensors 120 is illustrative. In some implementations, sensors may be coupled to the robotic arm, while the welding tool 110 is coupled to the sensors 120 (or housing thereof). The one or more sensors 120 may be employed to identify a weldable seam between objects to be welded. For example, one or more sensors 120 may include one or more cameras, which may be employed to scan objects that are to be welded to identify, confirm, or refine, or a combination thereof, the pose of the weldable seam.

In some implementations, the welding tool 110 (and/or other tools coupled to welding robot 108) may be configured to perform the welding task or operation responsive to an instruction, such as a weld instruction received from controller 122. The welding robot 108 may also be coupled to a movable device or may be configured to rotate, move along a rail or cable, or a combination thereof, as illustrative, non-limiting examples.

Storage 112 is one or more storage units (e.g., bins) that host one or more objects that are to be welded. The objects can be viewed as being in an initial resting pose in the storage 112. FIG. 1 illustrates a single storage area/storage 112 for objects. However, some implementations may include multiple bins within workspace 102, allowing for the organization of various objects. For example, each bin may hold objects with specific design and specification. The grasping robot 104, directed by controller 122, may pick objects from these bins. If a storage area (e.g., storage 112) is not within the robot's immediate reach, the robot may move closer using a system of rails, cables, or another mobile device. For example, the grasping robot 104 might move along a rail or cable. After the grasping robot 104 picks up an object, it may place it on the pose adjustment station 114 to adjust/correct its pose. If the grasping robot 104 had to move to pick an object, it may use the same traveling system to go closer to the welding station 116. In implementations with multiple grasping robots like grasping robot 104, each one may have a dedicated bin or object. After picking up their respective objects, these grasping robots adjust the objects' pose at pose adjustment station 114 and then place them on the welding station for welding.

In some implementations, storage 112 may host alike objects of the same specification. Stated another way, each time a grasping robot accesses the bin, it retrieves an identical component. In some implementations, a bin may not host identical objects. Stated another way, a bin may accommodate objects of varying specifications. In some implementations, a bin may simultaneously house multiple objects of different specifications. As noted above, in some implementations, multiple bins may be present in the workspace 102. Each of these bins may host objects with similar specifications, however, the objects in one bin may differ from those in another.

Pose adjustment station 114 is an intermediate staging area and may optionally be equipped with one or more pose adjustment fixtures 124. Pose adjustment station 114 may assume a variety of shapes. In some embodiments, pose adjustment station 114 is an elevated table of rectangular or square design, and may have a surface material which may be based on the nature of the objects it handles. While a pose adjustment station with metallic surfaces, such as stainless steel or aluminum could be used, in some implementations, non-metallic materials like plastic or a rubberized surface may be used. In implementations where sensitive electronic components are handled, the table's surface may use electrostatic discharge (ESD) safe materials.

Pose adjustment station 114 may include mounting points. These points may enable the affixation of optional primitive fixtures (also referred to in this disclosure as "pose adjustment fixtures 124") which could be used to adjust/correct the pose of the grasped object. In some implementations, pose adjustment station 114 is static, anchored firmly to the floor of workspace 102. In some implementations, pose adjustment station 114 may be movable, for example, equipped with lockable wheels or designed to be mounted on rails, where it can go from a first position to a second position, and vice versa.

Pose adjustment fixtures 124 may be primitive fixtures which are modular elements designed to hold, support, or align objects during various manufacturing processes. Examples of primitive fixtures may include square blocks, rectangular blocks, V-blocks (which may be used to orient round parts perpendicular to the surface), pins (which may be used for locating aligning an object relative to the table), plates (angled or non-angled—these provide a perpendicular surface to align an object). Pose adjustment fixtures 124 may be manually affixed to the pose adjustment station. Due to their modular nature, these fixtures can be viewed to be versatile and can be combined in various configurations, allowing for flexibility in handling a wide array of object geometries for pose adjustment.

The setup and placement of the pose adjustment fixtures 124 on the pose adjustment station 114 ensures that when an object is positioned in relation thereto, it confirms the object is resting in the desired/intended pose, called the "intermediate resting pose" herein. Stated differently, these fixtures act as reference points, guiding objects into their desired pose—a pose enabling the grasping robot 104 to regrasp the object in an "adjusted grasp pose" that orients the object at the welding station 116, facilitating the creation of an accurate seam with another object for high-quality welding.

Pose adjustment fixtures 124 can also be viewed as constraining mechanisms, forcing the object that is to be placed on the pose adjustment station 114 to adopt the desired pose (e.g., position and orientation). For instance, when the grasping robot 104 places an object on the pose adjustment station 114, it is configured to navigate the object's interaction with these fixtures, and this navigation results in a condition where the object is placed in its desired intermediate resting pose. Stated differently, the grasping robot 104—reacting to the shape, slots, or protrusions (or a combination thereof) of the pose adjustment fixtures-adjusts the object's pose to achieve the desired pose.

The positioning of the pose adjustment fixtures 124 on the pose adjustment station 114 may be known to controller 122. For example, the controller 122 may be provided with a CAD model or similar model showing the placement of the fixtures on the pose adjustment station 114. In some implementations, the pose adjustment fixtures 124 are affixed/installed by a user. In such implementations, the placement thereof may be determined by the controller 122 using one or more sensors 118 during the initial calibration, as described below.

Welding station 116 is designed to securely hold objects during welding operations. The welding station 116 may be an elevated table, a rotisserie comprising a headstock and tailstock, or another type of station on which welding operations may be performed. Welding station 116 may include welding fixtures 126, which may be designed using one or more fixture blocks (e.g., V-block), clamps, jigs, or holders to grip and position the objects in a suitable pose for welding. These fixtures can be adjustable, accommodating objects of varying sizes and shapes, and ensuring they are held steady before welding. The primary function of the welding fixtures 126 is to provide stability and guarantee precise alignment of the objects being welded.

In some implementations, the welding fixtures 126 may be set up or assembled, at least in part, based on the representation of the final assembled objects (e.g., CAD model of the final assembled objects). For instance, as previously mentioned, the goal of these fixtures is to place or hold the objects for welding in a relative pose, enabling the formation of an accurate weldable seam. As such, the welding fixtures 126 may be assembled to allow the objects intended for welding to be positioned relative to each other, facilitating the welding robot 108 to accurately weld the seam and produce the final welded product.

In some implementations, users may manually assemble the welding fixtures 126 on the welding station 116. In some implementations, the user may use controller 122 to initially create a build plan for assembling the welding fixtures 126. During operation, the controller 122 may access and/or receive a representation, such as a CAD model, of the final welded product. The controller 122 may also have access to a library of available fixture components (e.g., which may be stored in the memory of controller 122). Given this data and the available fixture elements, the controller 122 might generate a fixture setting that positions the objects relative to the fixtures to form a precise weldable seam. Furthermore, the controller 122 might produce a build plan for this fixture setting, e.g., a step-by-step guide for the user to set up the fixture. In some implementations, the construction of the fixture setting could be automated. For example, controller 122 might direct the grasping robot 104 to pick the right fixtures and instruct another robot (like a tooling robot equipped with an affixation tool as its end effector) to use the affixation tools, securing the fixtures to the welding station according to the build plan.

The combination of pose adjustment fixtures 124 for optimal regrasping and the welding fixtures 126 for final relative positioning significantly reduces the time and computational resources the controller 122 would traditionally expend in estimating the correct pose to bring the objects together to form a precise weldable seam.

Robotic welding system 100 also includes one or more sensors 118. The one or more sensors 118 may be employed to capture visual information (e.g., two-dimensional (2D) images or three-dimensional (3D) scanning) of the workspace 102. For instance, the sensors 118 may include cameras (e.g., stereoscopic cameras), scanners (e.g., laser scanners), etc. In some implementations, the sensor 118 may include sensors such as Light Detection and Ranging (LiDAR) sensors. Alternatively or in addition, the sensors 118 may be audio sensors configured to emit and/or capture sound, such as Sound Navigation and Ranging (SONAR) devices. Alternatively or in addition, the sensor may be electromagnetic sensors configured to emit and/or capture electromagnetic (EM) waves, such as Radio Detection and Ranging (RADAR) devices. Through visual, audio, electromagnetic, and/or other sensing technologies, the sensor may collect information about physical structures and objects in the workspace.

In some implementations, sensors 118 may be configured to capture visual information of objects located in storage areas, such as storage 112. In some implementations, one or more sensors 118 include multiple sensors or groups of sensors. For example, when multiple storage areas (e.g., multiple bins) are utilized, a first one or more sensors 118 might be configured to capture visual information from one storage area, while a second one or more sensors 118 may capture visual information from the other storage area. In some implementations, the sensor 118 may be positioned on static structures such as frames positioned in the workspace 102. In some implementations, The welding robot 108 may also be coupled to a movable device or may be configured to rotate, move along a rail or cable, or a combination thereof, as illustrative, non-limiting examples.

In some examples, the sensors 118 may collect static information (e.g., stationary structures in the workspace), and in other examples, the sensors 118 may collect dynamic information (e.g., moving structures in the workspace), and in still other examples, the sensors 118 may collect a combination of static and dynamic information. The sensors 118 may collect any suitable combination of any and all such information about the physical structures in the workspace 102 and may provide such information to other components (e.g., the controller 122) to generate a representation of the physical structures in the workspace 102. As described above, the sensor 118 may capture and communicate any of a variety of information types, but this description assumes that the sensor primarily captures visual information (e.g., 2D images or 3D scans) of the workspace 102.

Robotic welding system 100 employs controller 122 to perform computation(s) related to one or more operations described in this disclosure. Example operations include determining which object to pick from the bin, planning related to taking the object from bin to pose adjustment station, determining the position and orientation in which the object should be placed on the pose adjustment station 114 and regrasped in an adjusted grasp pose, and performing pre-welding operations and welding operations.

Controller 122 includes one or more suitable machines specifically and specially configured (e.g., programmed) to perform one or more operations as described below. In some implementations, the controller 122 is not a general-purpose computer and is specially programmed or hardware-configured to perform the one or more operations as described herein. Additionally, or alternatively, the controller 122 is or includes an application-specific integrated circuit (ASIC), a central processing unit (CPU), a graphics processing unit (GPU), a field programmable gate array (FPGA), or a combination thereof. In some implementations, the controller 122 includes a processor 128 and a memory 130. The processor 128 may include various forms of processor-based systems in accordance with aspects described herein. For example, the processor 128 may include a general purpose computer system (e.g., a personal computer (PC), a server, a tablet device, etc.) and/or a special purpose processor platform (e.g., application specific integrated circuit (ASIC), system on a chip (SoC), etc.). Furthermore, controller 122 may include local resources located proximate to the workspace 102, e.g., on a special purpose computer. Additionally or alternatively, controller 122 includes distributed computing resources 132 via a network interface to the internet, for example cloud based processing capabilities and storage solutions. Accordingly, the controller 122 is not limited to a specific architecture and may include local, distributed, and hybrid architectures.

The processor 128 may be designed to adjust the orientation, position, and imaging parameters of one or more sensors 118 (e.g., camera) while processing the data received from them, perform initial calibration of robotic welding system 100, perform object detection in storage areas such as storage 112, perform object pick-up from storage 112, perform object placement at pose adjustment station 114, perform object regrasp at pose adjustment station 114, perform pre-welding operations at welding station 116, and perform pose-related computation and robot trajectory, path, and weld planning, as illustrative, non-limiting examples.

Additionally, or alternatively, the controller 122 may be configured to generate control information, such as control information for one or more grasping robots (e.g., grasping robot 104), one or more welding robots (e.g., welding robot 108), one or more sensors 118, welding station 116, pose adjustment station 114, and storage 112. For example, the controller 122 may be configured to perform one or more operations as described herein.

The memory 130 may include ROM devices, RAM devices, one or more HDDs, flash memory devices, SSDs, other devices configured to store data in a persistent or non-persistent state, or a combination of different memory devices. The memory includes or is configured to store instructions, model information (e.g., computer aided model (CAD) data of objects in storage, CAD data of desired pose on pose adjustment station 114, CAD data of final welded product, and the like), sensor data captured by one or more sensors 118, pose information for example the desired pose at the pose adjustment station, and system information for example the information related to position and location of various entities within the workspace 102.

The controller 122 may be provided with a CAD file, or a point cloud model, that reflects the final assembly—essentially how the final assembly appears once the objects are welded. In some implementations, additional CAD files can be provided to the controller 122 (and stored in memory). These CAD files might include or display or represent each object individually. The controller 122 can be set up to parse or process one or more of these CAD files to identify the individual objects that need to be welded together. Based on this parsed data, the controller 122 can discern which objects constitute the final assembly. For instance, the controller 122 might use information, such as the shape of the objects in the final assembly, to identify and locate the target objects within a storage area, like storage 112. The controller 122 could employ segmentation and/or shape-identifying algorithms to ascertain the object to be selected. This is particularly useful when the storage area contains objects of varied geometries.

In one or more aspects, the memory 130 may store the instructions, such as executable code, that, when executed by the processor 128, cause the robotic welding system 100 to perform operations according to one or more aspects of the present disclosure, as described herein. In some implementations, the instructions (e.g., executable code which may be organized or described in terms of functional modules) is a single, self-contained, program. In other implementations, the instructions (e.g., the executable code) is a program having one or more function calls to other executable code which may be stored in storage or elsewhere. The one or more functions attributed to execution of the executable code may be implemented by hardware. For example, multiple processors may be used to perform one or more discrete tasks of the executable code.

In some implementations, the controller 122 may be informed of the intermediate resting pose in which the object should be positioned on the pose adjustment station 114. Based on the desired pose information, the controller 122 may generate a placement plan for the pose adjustment fixtures 124. In such implementations, the user may affix the pose adjustment fixture 124 onto the pose adjustment station 114 based on the controller's placement plan. In other words, the controller 122 may dictate where the pose adjustment fixtures 124 should be affixed to the pose adjustment station 114, such that the object is placed in the desired intermediate resting pose.

In some implementations, the number of pose adjustment fixtures 124 and the desired configuration thereof on the pose adjustment station 114 is dictated by the adjusted grasp pose. If, for example, the desired adjusted grasp pose is a vertical pose of an object, the pose adjustment fixtures are structured to actively prevent any alternate alignments.

In some implementations, this pose adjustment process is implemented with the assistance of force feedback sensors. The force feedback sensors could be embedded within the grasping tool 106 or be separate components coupled to the grasping robot 104. During operation, the grasping robot 104 brings the object near to the pose adjustment fixtures 124 such that while setting an object down, the object touches a portion of the pose adjustment fixtures 124. At this point, a feedback signal is sent to the controller 122, denoting the initial contact. The grasping robot 104 may then be configured to trace the profile of the fixture in one direction. As the trace progresses, additional contacts with other sections of the same fixture, or even different fixtures affixed strategically, provide further feedback. This iterative feedback enables the controller 122 to determine and recognize when the desired pose has been achieved. When the controller 122 determines that the desired pose has been achieved, the grasping robot 104 is instructed to drop the object at that position and orientation.

In some implementations, the controller 122 may receive information about the desired pose. In other words, for the controller 122, the desired pose of the object on the pose adjustment station 114 is a known state. For instance, a user might provide a representation (e.g., a CAD model, image depicting desired pose, and the like) indicating the desired pose of the object once it is placed on the pose adjustment station 114. In some configurations, the process of attaching the pose adjustment fixtures—or, in other words, positioning them on the pose adjustment station 114—might be automated. As an example, using the representation of the object's desired pose, the controller 122 may position and secure the pose adjustment fixtures 124 on the pose adjustment station 114 such that their placement leads to the desired pose when the object is placed on the pose adjustment station 114.

Before robotic welding system 100 begins welding, an initial calibration process may be performed to ensure the precise operation and interaction of various robotic systems. First, a robot-robot calibration may be performed. In some implementations, robot-robot calibration may be performed using a laser tracker, such as a FARO tracker manufactured by FARO Technologies, Inc®, to calibrate the position of the grasping robot 104 in relation to the welding robot 108. By doing this, the controller 122 ensures that both the grasping robots 104 and welding robot 108 interact in a synchronized manner. For example, FARO tracker measures the position and orientation of each robot, providing this data to the controller 122.

Next, calibration related to one or more sensors 118 may be performed. This calibration process includes using the grasping robot 104 to determine and calibrate the position of the one or more sensors 118. This calibration is related to understanding the one or more sensor's position(s) and orientation(s) in some external frame of reference, e.g., entities like the grasping robot 104 whose position and orientation within workspace 102 is known through the above-described calibration step. This calibration could be performed using a calibration object (e.g., checkerboard object); the grasping robot 104 could move the calibration object through the field of view of the one or more sensors 118.

Furthermore, following the calibration of sensor 118, sensor 120 coupled to welding robot 108 may be calibrated. This calibration may involve calibration between different camera systems in workspace 102 and between cameras and lasers, in case sensor 120 includes cameras and lasers.

Subsequently, the welding station 116 may also be calibrated. This calibration process may include using sensor 120, which is employed to pinpoint and calibrate the center of the positioner. By doing this, welding robot 108 can accurately work in tandem with the welding station 116. In addition to the calibration of welding station 116, the position of the welding fixtures 126 on the welding station 116 may also be calibrated. The positions and orientations of welding fixtures 126 can be captured using a point cloud generated using data captured from the one or more sensors 118. Information about the welding fixtures may also include the position and orientation in which the grasped object may be placed. For example, the point cloud generated using data captured from one or more sensors may include information that represents the position and orientation of objects in one or more coordinate systems, e.g., linear, curvilinear, cylindrical, and/or spherical. This information can be stored in a special purpose memory as matrix information or the like and retrieved by components to effectuate the advantages discussed herein.

In some implementations, certain other entities may also be calibrated. For example, in some implementations, the positions of storage 112 and pose adjustment station 114 are determined. The positions of these entities can either be captured using a point cloud generated using data captured from the one or more sensors 118 or through one or more touchpoint tests executed by the grasping robot 104. In some implementations, in addition to the position of the pose adjustment station 114, the position of the pose adjustment fixtures 124 on the pose adjustment station 114 may need to be calibrated. The positions and orientations of pose adjustment fixtures 124 can be captured using a point cloud generated using data captured from the one or more sensors 118.

After calibration, the robotic welding system 100 is initialized and is ready to grasp and regrasp objects and place the object in its final resting position relative to another object and perform welding.

The robotic welding system 100 may perform registration operations, e.g., to gather pose information of an object on the pose adjustment station 114 and/or welding station 116. This would, for example, confirm the pose adjustment and could inherently provide details regarding the object's position and orientation to controller 122. The usefulness of registration lies in confirming accuracy and precision (e.g., location, position, orientation, or pose accuracy, and the like) in processes like pose adjustment, accurate placement of objects for a precise welding operation or other manufacturing operations. An example registration technique is now described. The registration technique is configured to transform or align data from different sources, such as a CAD model point cloud and a 3D representation (e.g., point cloud generated using captured images using sensors such as sensors 118), with the same coordinate frame or system. To illustrate, the controller 122 may perform the registration process using the point cloud of a CAD model of an object when it is resting on the pose adjustment station 114 and/or welding station 116 and a 3D representation of the object (generated using sensor data). The registration process may be performed by sampling the CAD model point cloud and the 3D representation. The sampling may be performed such that the points in the CAD model point cloud and the 3D representation have a uniform or approximately uniform dispersion or equal or approximately equal point density. Based on the sampling, the coordinate systems of the model and the 3D representation may be coarsely (e.g., with resolution of 1 cm) and finely (e.g., with a resolution of 1 mm) aligned.

Exemplary operations of robotic welding system 100 will now be described.

Figure 2:
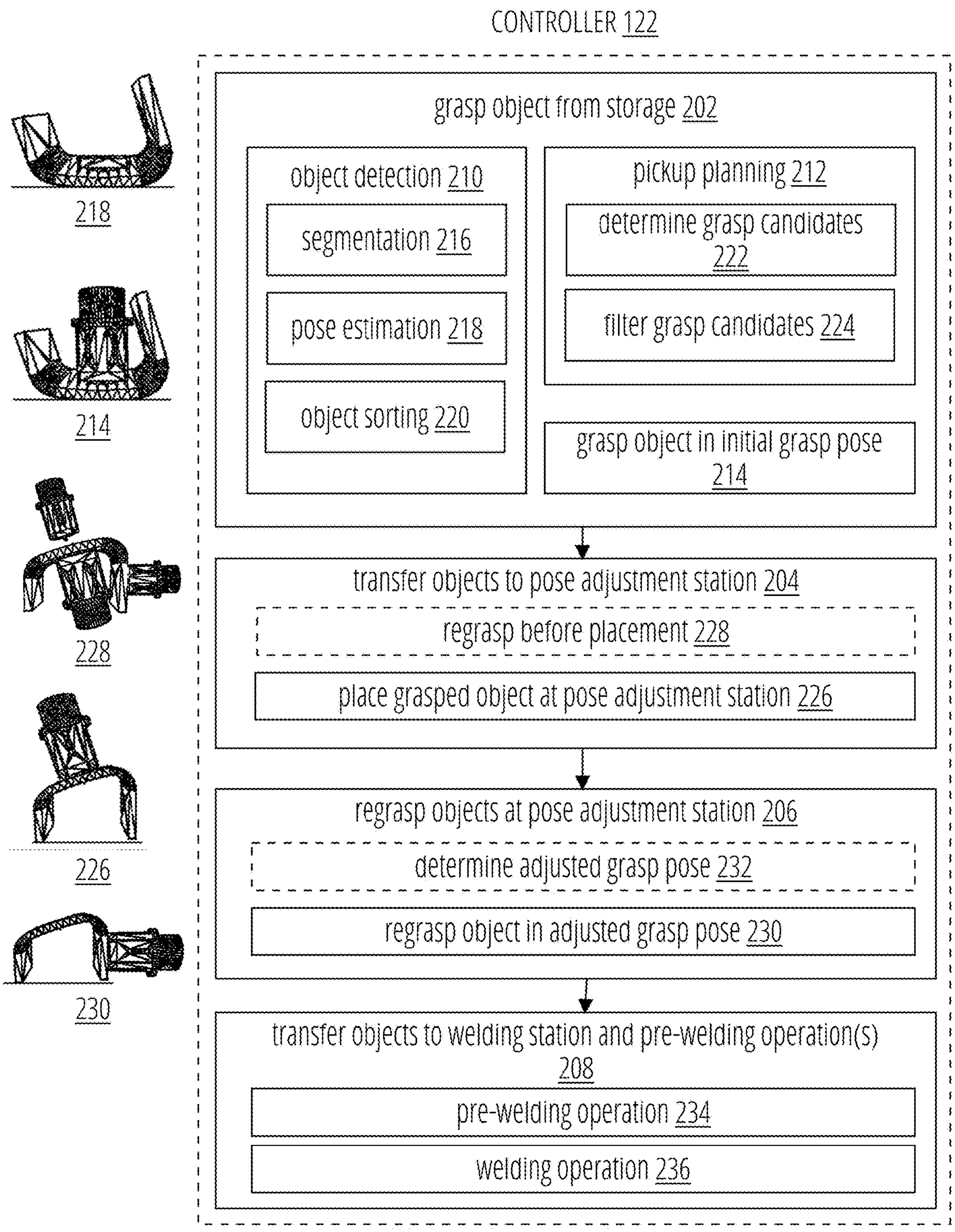
FIG. 2 illustrates modules of the robotic welding system of FIG. 1 encoding pose adjustment operations according to the present disclosure.

FIG. 2 describes modules of controller 122 encoding in the memory 130 thereof and/or in distributed computing resources 132, as machine logic, pose adjustment operations and workflows which may be executed the processor 128 in order to reduce weld cycle times. To facilitate understanding, schematics of certain poses and grasp poses of the modules are illustrated in the left margin. Any of the following operations may be performed by the robotic welding system 100 described in FIG. 1. Accordingly, to facilitate understanding, the operations are described with reference to element of robotic welding system 100. However, the operations may be performed independently of robotic welding system 100. Specific representative robotic welding methods are described in FIG. 3A-FIG. 3E.

Controller 122 includes modules 202, 204, 206, and 208 corresponding to phases of the pose adjustment techniques, namely grasping objects from storage, transferring the objects from storage to the pose adjustment station, regrasping objects at the pose adjustment station, and performing pre-welding operations and welding operations at the welding station. Accordingly, controller 122 includes modules that grasp object from storage 202, transfer objects to pose adjustment station 204, regrasp objects at pose adjustment station 206, and transfer objects to welding station and pre-welding operation(s) 208.

Note that the operations of FIG. 2 are generally described in the context of a representative configuration of a robotic welding system comprising a single grasping robot and a single welding robot. This is not limiting. Other robotic welding system configurations, while different, can implement the same operations described below. These principles include grasping, pose adjustment (transferring to the pose adjustment station and regrasping), regrasping on the pose adjustment station, and performing pre-welding operations and welding operations at the welding station. For instance, an alternative configuration might comprise four grasping robots, one welding robot, and two storage bins. Each bin could contain objects with different configurations or objects that are intended to be welded together or as part of a common assembly. In such a setup, a first grasping robot might detect and grasp a first object from the first bin, then place it on pose adjustment station for pose adjustment. Subsequently, a second grasping robot might retrieve the pose-adjusted first object from pose adjustment station and transport it to the welding station in relation to the welding fixture. Concurrently or sequentially, a third grasping robot might detect and/or retrieve a second object from the second bin and place it on the pose adjustment station for pose adjustment. Following this, a fourth grasping robot might retrieve the object from the pose adjustment station, ensuring it is aligned correctly for the welding process. Subsequently, controller may clamp the objects, perform registration, and instruct the welding robot to perform welding at the seam formed between the first and second objects. Accordingly, the following operations may be applied in many different contexts and by robotic welding systems having many different configurations.

Grasp Object from Storage 202

The process shown in FIG. 2 begins module 202, according to which the one or more grasping robots 104 pick or grasp a plurality of objects having the same or different characteristics (e.g., geometries) from a highly unstructured storage area (e.g., one or more storages 112), prior to transferring those objects to the pose adjustment station 114 for regrasping in one or more adjusted grasp poses that facilitate one or more pre-welding operations. This phase includes modules for object detection 210, pickup planning 212, and to grasp object in initial grasp pose 214.

Object detection 210 module detects which objects to grasp from highly unstructured storage 112 and determines the corresponding initial grasp poses for those objects, i.e., the poses according to which the grasping tool 106 grasps those objects before transferring the objects to the pose adjustment station 114. Object detection 210 includes modules for segmentation 216, pose estimation 218, and object sorting 220 (e.g., using a ranking mechanism).

Starting with segmentation 216, the initial step may include capturing image data of the storage 112 using one or more sensors 118. The captured image data may be processed by controller 122 to generate a point cloud, depth map, or texture map of the imaged storage 112, or a combination thereof. The controller 122 provides one or more of the foregoing generated data and/or the captured image data to a segmentation algorithm or network present in the controller 122 or operably coupled thereto. The segmentation algorithm or network distinctly masks each individual part present within the scene. Representative segmentation algorithms include traditional methods like edge detection (e.g., Sobel, Canny), region-based techniques (e.g., region growing), clustering methods (e.g., k-means), and artificial neural network approaches like Convolutional Neural Networks (CNNs), Fully Convolutional Networks (FCNs), and U-Nets. Additionally, advanced approaches such as transformer-based models (e.g., Vision Transformers, Swin Transformers), Graph Neural Networks (GNNs), and models for 3D data (e.g., PointNet) are relevant for tasks involving complex spatial structures such as point clouds.

In some implementations, the segmentation algorithm or network may also receive data parsed within a three dimensional data file (e.g., CAD file), or a point cloud model, that reflects the final assembly or the individual objects. The masking process distinguishes objects inside the storage 112 such that each of the objects are individually identifiable. The controller 122 then masks each identified object, and from these masks, generates individual point clouds for each identified object.

Following segmentation, the controller 122 may perform pose estimation 218 to understand the resting pose (orientation and position) of each masked object in the storage 112 from the individual point clouds. For this, the extracted point clouds of the objects may be converted into depth maps. Subsequently, these depth maps may be provided to a pose estimation network or algorithm operably coupled to the controller 122 which has been trained to determine the pose of each masked object. Representative pose estimation networks include convolutional neural networks (CNNs) such as OpenPose for multi-person pose detection, AlphaPose for high-accuracy human keypoint estimation, DensePose for mapping 2D images to 3D body surfaces, and PoseNet for camera pose estimation. Additionally, transformer-based models like PoseFormer, Graph Neural Networks (GNNs) such as GNNPose, and 3D-focused networks like PointNet and 6D Object Pose Estimation (e.g., PoseCNN) are effective for determining object pose, particularly in complex or occluded environments. This pose determination process may be executed for every masked object within the storage 112. As a result, controller 122 determines a resting pose corresponding to each object. A representative resting pose of an object is shown in the left margin.

After determining the resting poses, controller 122 performs object sorting 220 to determine which object to pick from storage 112. In some implementations, a ranking technique may be employed. In some implementations, the object that is unhindered and occupies a position atop the other objects may be selected to be grasped. To identify the object to be grasped by the grasping tool 106 amongst other objects in the storage 112, controller 122 generates candidate initial grasp poses of grasping tool 106 (grasp positions and/or orientations) for at least some objects in storage 112. These candidate initial grasp poses are based upon the point cloud and/or mesh representation of each object, and represent potential locations on the object where grasping tool 106 may securely grasp the object. In some embodiments, the identification of initial grasp pose candidates is based on a physics-based model that determines stable and unstable candidate grasp poses based upon physical characteristics of the object (e.g., mass, gravity, center of mass, geometry, coefficient of friction). A stable grasp pose is a grasp pose (i.e., how and where the grasping tool grasps the object, in terms of its grasping location and orientation) that enables the grasping tool to securely grasp the object without dropping the object and/or without the object unpredictably changing position relative to the grasping tool. The stability of a grasp pose may be determined with reference to gravity as well as a motion plan of the grasping tool. In some embodiments, initial grasp pose candidates are generated by a machine learning model trained with representations of stable and unstable initial grasp pose candidates, which representations are generated by the physics based model.

For each object, the process of object sorting 220 yields a finite number (e.g., M>10) of candidate grasp poses, each of which includes positional information. In some implementations, out of the foregoing M initial grasp pose candidates, the initial grasp pose candidates with the high positional value (e.g., in a z-direction relative to the base of storage 112) may be filtered for each object. Upon determining the initial grasp pose candidates for all detected objects, a final sorting procedure ranks the objects; the object with the highest grasp position (e.g., from the base of storage 112. i.e., Z coordinate value) secures the top rank and is the primary candidate for picking. In some implementations, this object at this stage is grasped by grasping robot 104 at the highest grasp position.

After object detection 210 determines which object to grasp from within the storage 112, the controller 122 performs pickup planning 212 to determine the initial grasp pose of the object and path planning from the storage 112 to the pose adjustment station 114.

To the extent not determined by object sorting 220, pickup planning 212 includes a module to determine grasp candidates 222, i.e., determining initial grasp pose candidates for the objects ranked highest in object detection 210 using any of the approaches described above. The initial grasp pose candidates are generated by an initial grasp pose model or network operably coupled to the controller 122, which generates initial grasp poses across the point cloud surface of each object, e.g., distributed uniformly across the surface. When determining the grasp candidates, the controller 122 may consider pose information of how the grasping tool 106 is oriented in 3D space. In other words, initial grasp pose candidates may include the pose information of the grasping tool. Controller 122 may also consider the position of the pose adjustment fixture 124 on the pose adjustment station and the desired intermediate resting pose of the object relative to the pose adjustment station 114 and/or pose adjustment fixture 124. The initial resting pose in which the object is set down relative to the pose adjustment station 114 may be pre-determined or autonomously determined by the controller 122 (e.g., using expected data from the force feedback sensor, as described above).

In some embodiments, the initial grasp pose candidates may satisfy one or more feasibility constraints of a physics-based model, for example geometric constraints of the grasping tool 106 and the object to ensure sufficient contact between the grasping tool 106 and the object, collision feasibility between the grasping tool 106 and object, and the geometry of any pose adjustment fixture 124 on the pose adjustment station 114. The model or network may also internalize characteristics of the object and grasping tool 106 (e.g., mass, gravity, coefficient of friction). Based on the foregoing factors, the model or network generates initial grasp pose candidates for the highest ranking objects.

In some embodiments, a grasp candidate network identifies and selects initial grasp poses in which the grasping robot 104 grasps the objects in storage 112, based upon images captured by the sensor 118. The grasp candidate network is trained with a dataset comprising representations of stable and unstable grasp poses, which may be generated by a physics-based model as described above. The training dataset may include additional information, including geometry and physical properties of the object, initial resting pose, potential grasp points, as well as an intermediate resting pose (i.e., the intended resting pose of the object on the pose adjustment station 114). Representative types of networks for the grasp candidate network include convolutional neural networks (CNNs) such as GraspNet for identifying optimal grasp points, Recurrent Neural Networks (RNNs) like LSTM-based models for sequential grasp prediction, and Graph Neural Networks (GNNs) such as G2N2 approaches that leverage object geometry and relationships to determine stable grasp poses. Additional representative networks could include transformer-based models and 3D-focused networks (e.g., PointNet++) that are effective for grasp pose prediction in complex environments.

Pickup planning 212 may also include a filter grasp candidates 224 module to filter the initial grasp poses, when transitioning from the storage 112 to the pose adjustment station 114. The first filter may relate to a contact interface area between the object and the grasping tool 106; poses with a contact area below a predefined percentage may be ignored. The second filter may relate to potential for collision between the grasping tool 106 and the object. For example, the second filter may remove initial grasp pose candidates that would lead to a collision between the gripper and the object. The third filter may also relate to collision but this time with other entities within the workspace 102. For example, the third filter simulates trajectories of grasping robot 104 from storage 112 to pose adjustment station 114 and filters out the poses and trajectories of grasping tool 106 that collide with meshes of any other entities in the workspace 102 between or surrounding both the storage 112 and pose adjustment station 114. These filtration processes result in a filtered initial grasp pose which is then be employed by the grasping robot 104 to grasp the object from storage 112.

Based upon pickup planning 212, the grasp object in initial grasp pose 214 module causes the grasping tool 106 to grasp the object in the initial grasp pose in preparation for transfer to the pose adjustment station 114. Intuitively, due to the spatial variation between objects in storage 112, there will be significant variability in the initial grasp poses between objects. Accordingly, this aspect of the operations is highly unstructured. The left margin shows the grasping tool grasping an object in an initial grasp pose.

Transfer Objects to Pose Adjustment Station 204

Subsequently, controller 122 instructs grasping robot 104 to transfer the grasped object to the pose adjustment station 114 for eventual regrasp from the initial grasp pose to an adjusted grasp pose that facilitates pre-welding operations and welding operations. This module includes path planning operations that generates a motion path of the grasping robot 104 from the storage 112 to the pose adjustment station 114. As a representative example, path planning operations may be configured for graph-matching or graph-search approaches to generate a path or trajectory of the grasping robot 104 conforming to one or more constraints, such as avoiding collisions in the workspace 102 and minimizing travel time and/or travel distance. Representative path planning logic may employ one or more algorithms such as A* or Dijkstra's algorithm for this purpose.

The adjusted grasp pose may be a common adjusted grasp pose for all objects of a same type and/or geometry in order to increase repeatability and reduce the computational intensity of transferring the objects from the pose adjustment station 114 to the welding station 116.

The adjusted grasp pose may be known to the controller 122, e.g., based on input from a programmer. Therefore, before the object can be regrasped in the adjusted grasp pose, the controller 122 instructs grasping robot 104 to place the grasped object on the pose adjustment station 114 or relative to the pose adjustment fixture 124 in an intermediate resting pose that enables regrasping at the adjusted grasp pose. For example, if the known adjusted grasp pose requires that the grasping tool 106 grasp an end portion of the object, e.g., to facilitate an insertion pre-welding operation, then the intermediate resting pose should enable that insertion task, i.e., by not obstructing the end portion.

Accordingly, controller 122 comprises a place grasped object at pose adjustment station 226 module. The intermediate resting pose may be predetermined, e.g., based on the known adjusted grasp pose and/or placement of the optional pose adjustment fixtures 124 on the pose adjustment station 114. In other embodiments, for example embodiments in which the pose adjustment station 114 does not include pose adjustment fixtures 124, the controller 122 may determine the intermediate resting pose. The controller 122 may determine the intermediate resting pose via a pose estimation network or algorithm operably coupled to the controller 122 which has been trained to determine the intermediate resting pose based on the desired adjusted grasp pose for each object type. For example, in some embodiments, the pose estimation network is a CNN, Recurrent Neural Network (RNN), or Graph Neural Networks (GNN) trained with a dataset comprising representations of feasible and infeasible intermediate resting poses, which may be generated by a physics-based model as described above. Feasible intermediate resting poses could be any pose in which the object can be placed in a gravitationally stable manner upon the pose adjustment station and which satisfies one or more constraints related to a known adjusted grasp pose, e.g., the intermediate resting pose does not obstruct any location of the object where the grasping robot 104 regrasps the object from the pose adjustment station 114, and the intermediate resting pose places the object in an orientation in which the regrasp location is accessible to the grasping robot 104.

In some embodiments, the intermediate resting pose on the pose adjustment station 114 is the same with respect to the grasping robot 104 for all objects of a common type and/or geometry. Restated, alike objects are placed by the grasping tool 106 on the pose adjustment station 114 in the same orientation, either at the same location on the pose adjustment station 114 (serially) or different locations (e.g., in a queue-see FIG. 3D-FIG. 3E).

In other embodiments, the intermediate resting pose on the pose adjustment station 114 is not the same, but within a predefined range of variability. For example, the grasping tool 106 may place alike objects in a common orientation, e.g., plus or minus ten degrees. This variability may enable the overall system to optimize for cycle time.

When the intermediate resting pose is determined, the grasping tool 106 releases the object on the pose adjustment station 114, e.g., on a horizontal surface thereof or relative to optional pose adjustment fixtures 124. As noted above, the placement of the optional pose adjustment fixture 124 on the pose adjustment station 114 is such that once the object settles relative thereto, the object can be considered to be in the desired intermediate resting pose. Furthermore, the grasping robot 104 may use feedback received from force feedback sensors to settle the object relative to the intermediate resting pose and/or pose adjustment fixtures. The left margin shows the grasping robot placing the object from on the pose adjustment station in the intermediate resting pose.

During operation, a force sensor can send feedback signals to controller 122. These signals allow the controller 122 to assess if the object has been settled in the desired intermediate resting pose. For instance, after the grasping robot 104 grasps an object from storage 112, it may move to place the object on pose adjustment station 114 in relation to the pose adjustment fixtures. As a first step, the controller 122 may be configured to instruct the grasping robot 104 to have the object make contact with the pose adjustment fixtures. At the point the object makes contact with the fixtures, the force feedback sensor registers the contact. The rest of the path of contact may be pre-set (e.g., programmed by a user) or planned by the controller 122 using expected feedback from the force sensor. For instance, as the object starts to touch the pose adjustment fixtures, the controller 122 may instruct grasping robot 104 to lower the object until it touches the pose adjustment station 114. At this stage, the controller 122 determines that the object is in touch with both the pose adjustment fixtures and the table.

In some embodiments, the controller 122 is configured to trace the shape of the pose adjustment fixtures and/or the pose adjustment station 114 up to a specified distance or up until a threshold force feedback is registered (e.g., signifying contour change in the fixture or table) or up until another contact is registered by the force sensor (this instant contact may be with another pose adjustment fixture). Once that distance has been traveled or threshold force is registered or the other contact is made, the controller 122 determines that the object is in the desired intermediate resting pose and is ready for release and regrasp. In some implementations, before regrasping, the controller 122 may instruct the one or more sensors 118 to capture image data related to the settled object to register and confirm its placement relative to the pose adjustment fixtures.

Occasionally, an object is disposed in the storage 112 in such a way that its initial grasp pose is not conducive to placing that object in the intermediate resting pose on the pose adjustment station 114. In such embodiments, the object may need to be regrasped before placement on the pose adjustment station 114 in the intermediate resting pose.

Accordingly, controller 122 optionally comprises a regrasp before placement 228 module to make this determination and to regrasp the object. In such embodiments, the controller determines whether the object needs to be regrasped prior to placement in the intermediate resting pose. This determination may be made based upon whether the object grasped in the initial grasp pose can be placed on the pose adjustment station 114 in the intermediate resting pose. For example, the initial grasp pose may obstruct a placement surface of the object (e.g., a bottom surface) and preclude placement in the intermediate resting pose. In such an event, the object needs to be regrasped.

If the controller 122 determines that a regrasp is necessary or desirable prior to placement of the object in the intermediate resting pose, then controller 122 determines a preliminary regrasp pose in which the grasping tool 106 regrasps the object prior to placement on the pose adjustment station 114 in the intermediate resting pose. The preliminary regrasp pose follows a similar process as described with respect to determine grasp candidates 222 module, i.e., utilizing a regrasp network or model to determine a regrasp pose. The regrasp network or model may receive several states as inputs, including the initial grasp pose and the desired intermediate resting pose. Based on these states, the regrasp network may output a staging pose and a regrasp pose. The grasping tool 106 temporarily parks the object in the staging pose on a preliminary pose adjustment station (e.g., an elevated table or a static magnetic grasper) or on the pose adjustment station 114, releases the object, then regrasps the object in the regrasp pose, which enables successful placement of the object on the pose adjustment station 114 in the intermediate resting pose. The grasping robot 104 then transfers the object to the pose adjustment station 114. The left margin shows a plurality of grasping robots regrasping the object from the initial grasp pose to a regrasp pose.

Regrasp Objects at Pose Adjustment Station 206

The intermediate resting pose is a relatively structured state as compared to the storage 112, as the object's position and orientation are known by the controller 122 and do not need to be re-determined. Further, the intermediate resting pose is selected to facilitate grasping in the adjusted grasp pose for transference to the welding station 116. Accordingly, the object is ready to be regrasped in the adjusted grasp pose and transferred to the welding station 116.

The adjusted grasp pose is selected to facilitate a downstream pre-welding operation and/or welding operation. Pre-welding operations may include any number of tasks, for example placement tasks, insertion tasks, alignment tasks, and other fitup tasks related to the precise positioning of the object relative to a workpiece (e.g., another object to which the first object will be welded or a welding fixture 126).

In some embodiments, the pre-welding operations include a placement task, i.e., placing the object on the welding station, e.g., on or relative to a welding fixture 126. The adjusted grasp pose enables unobstructed and verifiable placement of a placement surface of the object (e.g., a bottom surface) on the welding station.

In some embodiments, the pre-welding operations include an alignment task, i.e., aligning a feature of the object with one or more reference objects on the welding station (such as a workpiece). The adjusted grasp pose therefore enables unobstructed and verifiable alignment of an alignment feature of the object (e.g., an edge, corner, tack weld, etc.) with the one or more features of the reference object, e.g., another edge forming an unwelded seam with the object.

In some embodiments, the pre-welding operations include an insertion task, i.e., inserting the object into one or more receiving objects on the welding station. The adjusted grasp pose enables unobstructed and verifiable insertion of the object (e.g., an insertion of an object) into the receiving object (such as a slot or aperture thereof). Accordingly, the adjusted grasp pose does not grasp the insertion end of the object.

The foregoing pre-welding operations may be verified and controlled with sensors 118, 120 (e.g., cameras and/or force feedback sensors). Accordingly, successful completion and verification of the pre-welding operation validates the adjusted grasp pose.

The welding operations generally include fusing the object to another object with the welding tool 110 along an unwelded seam between the two objects. Accordingly, the adjusted grasp pose facilitates the welding operation by enabling unobstructed positioning of the seam edge of the object relative to the other seam edge of the second object.

In some embodiments, the adjusted grasp pose is a known state, e.g., programmed into the controller 122 by a human operator. In such embodiments, the predetermined adjusted grasp pose facilitates the pre-welding operations as described above. The controller 122 executes a regrasp object in adjusted grasp pose 230 module, according to which the controller 122 causes the grasping tool 106 to grasp the object in the adjusted grasp pose and transfer the object to the welding station 116 for pre-welding operations and welding operations.

In other embodiments, the controller 122 determines the adjusted grasp pose using an optional determine adjusted grasp pose 232 module. In such embodiments, the regrasping process includes a process similar to pickup planning 212.

For example, in some embodiments, the adjusted grasp pose candidates are generated by an adjusted grasp pose candidate network or model operably coupled to the controller 122. The adjusted grasp pose candidate network generates candidate adjusted grasp poses across the point cloud surface of the object. When determining the adjusted grasp pose candidates, the network considers the pre-welding operations to be performed on the welding station 116, e.g., one or more of a placement task, an alignment task, and/or an insertion task. Accordingly, the adjusted grasp pose candidate network may be trained with a dataset including annotated representations of adjusted grasp poses that do and do not enable and/or facilitate the pre-welding operations, for example, representations of adjusted grasp pose candidates that do and do not obstruct a placement surface, alignment feature, or an insertion end of the object. The training dataset may be generated by a physics-based model that internalizes additional information, including the geometry and physical properties of the object (e.g., mass, gravity, center of mass, geometry, coefficient of friction), intermediate resting pose, and potential grasp points. Representative types of networks for the adjusted grasp pose candidate network include convolutional neural networks (CNNs), Recurrent Neural Networks (RNNs) like LSTM-based models, and Graph Neural Networks (GNNs) such as G2N2 approaches. Additionally, transformer-based models and 3D-focused networks (e.g., PointNet++) can be employed for determining adjusted grasp poses, particularly when factoring in pre-welding tasks like placement, alignment, or insertion.

In some embodiments, the adjusted grasp pose candidates are generated by a physics-based model based upon characteristics of the object and grasping tool 106 (e.g., mass, gravity, coefficient of friction).

In all embodiments, controller 122 may generate adjusted grasp poses based upon sensor data (e.g., images) captured by the sensors 118 and/or 3D representations of the object in the intermediate resting pose on the pose adjustment station 114 (e.g., a CAD model). Additionally or alternatively, controller 122 may also consider pose information of how the grasping tool 106 is oriented in 3D space. Controller 122 may also consider the position of the welding fixtures 126 on the welding station 116, such as from a CAD model showing or sensor data from sensors 118 showing the placement of the welding fixture 126 on the welding station 116. The final pose in which the object is set down relative to the welding fixtures 126 may be pre-determined or autonomously determined by the controller 122 (e.g., using expected data from the force feedback sensor, as described above).

In all embodiments, the adjusted grasp pose candidates may satisfy one or more feasibility constraints, for example geometric constraints of the grasping tool 106 and the object to ensure sufficient contact between the grasping tool 106 and the object, collision feasibility between the grasping tool 106 and object and optionally other elements in the workspace 102 (e.g., the welding fixtures 126 and workpieces to which the object will be welded), and the geometry of any pose adjustment fixtures on the pose adjustment station.

Accordingly, the adjusted grasp pose candidate network and/or model generates adjusted grasp pose candidates.

The adjusted grasp pose candidates may be processed through one or more of the following filters. One filter may relate to the contact surface of the grasping tool 106; adjusted grasp pose candidates with a contact area less than a predefined threshold may be ignored. Another filter may relate to potential for collision between the grasping tool 106 and the object. Yet another filter may relate to collision but this time with other entities within the workspace 102. For example, the filter simulates trajectories of grasping robot 104 from pose adjustment station 114 to welding station 116 and filters out the adjusted grasp pose candidates that collide with the meshes (e.g., of any other entities) in the region between or surrounding both the welding station 116 and pose adjustment station 114, for example welding fixtures 126.

Yet another filter may relate to pre-welding operation, welding operation, and assembly feasibility. This filter disregards adjusted grasp pose candidates that preclude pre-welding operations such as placement, insertion, and/or alignment, in addition to adjusted grasp pose candidates that might cause collisions with the assembly, e.g., objects already placed and/or assembled on the welding fixtures 126, as well as adjusted grasp pose candidates that obstruct the weld torch, ensuring it has clear access to the seams.

The foregoing processes result in an adjusted grasp pose that the grasping tool 106 utilizes to regrasp the object from pose adjustment station 114 for transference to the welding station 116. In some embodiments, the controller 122 instructs the grasping tool 106 to grasp the object in the adjusted grasp pose and transfer the object to the welding station 116 for pre-welding operations and welding operations. The left margin shows the grasping robot grasping the object from the pose adjustment station in the adjusted grasp pose.

Transfer Objects to Welding Station and Pre-Welding Operation(s) 208

The controller 122 instructs the grasping tool 106 to grasp the object in the adjusted grasp pose and transfer the object to the welding station 116 for pre-welding operations and welding operations. This module includes path planning operations that generates a motion path of the grasping robot 104 from the pose adjustment station 114 to the welding station 116, as described above.

The controller 122 executes pre-welding operation 234 module, according to which the controller 122 instructs the grasping tool 106 to perform one or more pre-welding operations, for example placement, insertion, alignment, and other pre-welding operations as described above, which conclude with the object being placed in the final pose upon the welding fixtures 126.

In some implementations, the pre-welding operations and final pose at the welding station 116 relative to the welding fixtures 126 are known, e.g., programmed by a human programmer. In such implementations, the grasping tool 106 performs the predetermined pre-welding operations and releases the object in the final pose on the welding fixtures 126. Additionally or alternatively, in some implementations, positioning of the welding fixture 126 in the workspace 102 may be known (after initial calibration).

In all embodiments, the grasping tool 106 may execute the pre-welding operations utilizing sensor data from the sensors 118 (e.g., force feedback and/or images), e.g., utilizing a procedure similar to place grasped object at pose adjustment station 226 module. For example, the force sensor can send feedback signals to controller 122. These signals allow the controller 122 to assess if the object has been settled in the welding fixtures 126. For instance, after the grasping robot 104 picks up an object from the pose adjustment station 114, it may move to place the object on welding station 116 in relation to the welding fixture 126. As an initial step, since the controller 122 has information about the position of the welding station 116 and welding fixture 126 from initial calibration, the controller 122 may be configured to instruct the grasping robot 104 to cause the object to make contact with the welding fixtures 126. At the point the object makes contact with the welding fixtures 126, the force feedback sensor registers the contact. The remainder of the path of contact may be pre-set (e.g., programmed by a user) or planned by the controller 122 using expected feedback from the force sensor. For instance, as the object starts to touch the welding fixture 126, the controller 122 may instruct grasping robot 104 to lower the object until it touches another portion of the welding fixture 126. The controller 122 can be configured to trace a portion of the welding fixture 126 (e.g., up to a specified distance) or up until a threshold force feedback is registered (e.g., signifying contour change in the fixture or table). Once that distance has been traveled or threshold force is registered or the other contact is made, the controller 122 determines that the object could be placed on the welding fixture 126 and is ready for release and released.

Following release of the object in the final pose, the controller 122 may either proceed welding operation 236 or instruct the grasping robot 104 to again execute the foregoing modules 202, 204, 206 in order to provide another object to the welding station 116, e.g., as part of an assembly with the first object (see the assemblies of FIG. 3B-FIG. 3E).

For example, in embodiments in which the welding station 116 is not provided with a workpiece or second object to be welded to the first object, the controller 122 instructs the grasping robot 104 to grasp a second object from the storage 112 (e.g., from the same or different bin present in the workspace 102). The controller 122 may follow similar steps as described above to grasp the second object from the storage area. Once the second object has been grasped in the initial grasp pose, placed in the intermediate resting pose on the pose adjustment station 114, regrasped in the adjusted grasp pose, and placed on the welding station 116 such that the first object and the second object form an accurate weldable seam, the controller 122 may control the welding fixtures 126 and clamp the two or more objects together. The controller 122 may further proceed to the welding operation 236.

When the object(s) are prepared for welding, the controller 122 executes the welding operation 236 module and instructs the welding robot 108 to perform welding on the unwelded seam formed by the object(s). In some implementations, the controller 122 may first register the two fixtured objects (e.g., using a registration technique) to confirm the relative placements of the objects. The welding robot 108 may then perform welding at the seam.

In some implementations, the controller 122 may not perform any registration step and welding robot 108 may be pre-programmed to perform welding at the seam. In implementations where multiple grasping robots are employed, each grasping robot has a designated role. After picking their respective object, each grasping robot may place that object onto the welding station 116 and optionally hold the respective objects securely in place, i.e., completely or partially replacing welding fixtures 126. Once the objects are aligned for welding, the welding robot 108 may proceed to weld the objects. In some implementations, before welding is performed, the controller 122 may instruct welding tool 110 to use the sensor 120 to scan the objects placed on the welding station 116. Based on the pre-weld scan, the controller 122 registers the objects, and based upon the registration, confirms or refines the final poses of the objects in order to achieve a weldable seam.

When the pre-welding operations for an object are complete and the object is in the final pose on the welding station 116 along with any other workpieces to which the object is to be welded, the controller 122 commences welding operations 236 and instructs the welding robot 108 to weld an unwelded seam formed between the object and the workpiece, e.g., with a single or multiple passes of the welding tool 110.

Welding operations 236 may include performing a pre-weld scanning operation in order to register the objects and identify the seam to be welded. Based on identification of the seam, the controller 122 may generate multiple waypoints along the weldable seam. The multiple waypoints may include a set of points, each, in some implementations, constraining the welding robot 108 in at least one degree of freedom. Waypoints may include, indicate, or correspond to a location along the seam. In some implementations, seam-related information may include or indicate waypoints, and each of the waypoints may have associated motion and welding parameters.

The foregoing modules may be executed repeatedly, e.g., to bring two or more objects from storage to the welding station in order to form an assembly with an unwelded seam for welding, and then welding the seam. After completion of the welding operation(s) on each object, the welded object/assembly may be transferred by a robot arm to a separate storage.

Representative robotic welding methods of the present disclosure will now be described with reference to FIG. 3A-FIG. 3E. Any of the following methods may be performed by the robotic welding system 100, executed by the controller 122, or performed independently of the robotic welding system 100. The methods of FIG. 3A-FIG. 3E are representative, not limiting, and are intended to convey that the methods may be performed in many different robotic welding system configurations, e.g., with different numbers of different objects, robot arms, grasping tools, welding tools, pose adjustment stations, and welding stations. Furthermore, any of the methods described with respect to FIG. 3A-FIG. 3E may be adapted to include any one or more features described with respect to FIG. 1 and FIG. 2. Restated, any combination of one or more features described with respect to FIG. 1 and FIG. 2 may be restated as methods of FIG. 3A-FIG. 3E.

Figure 3A:
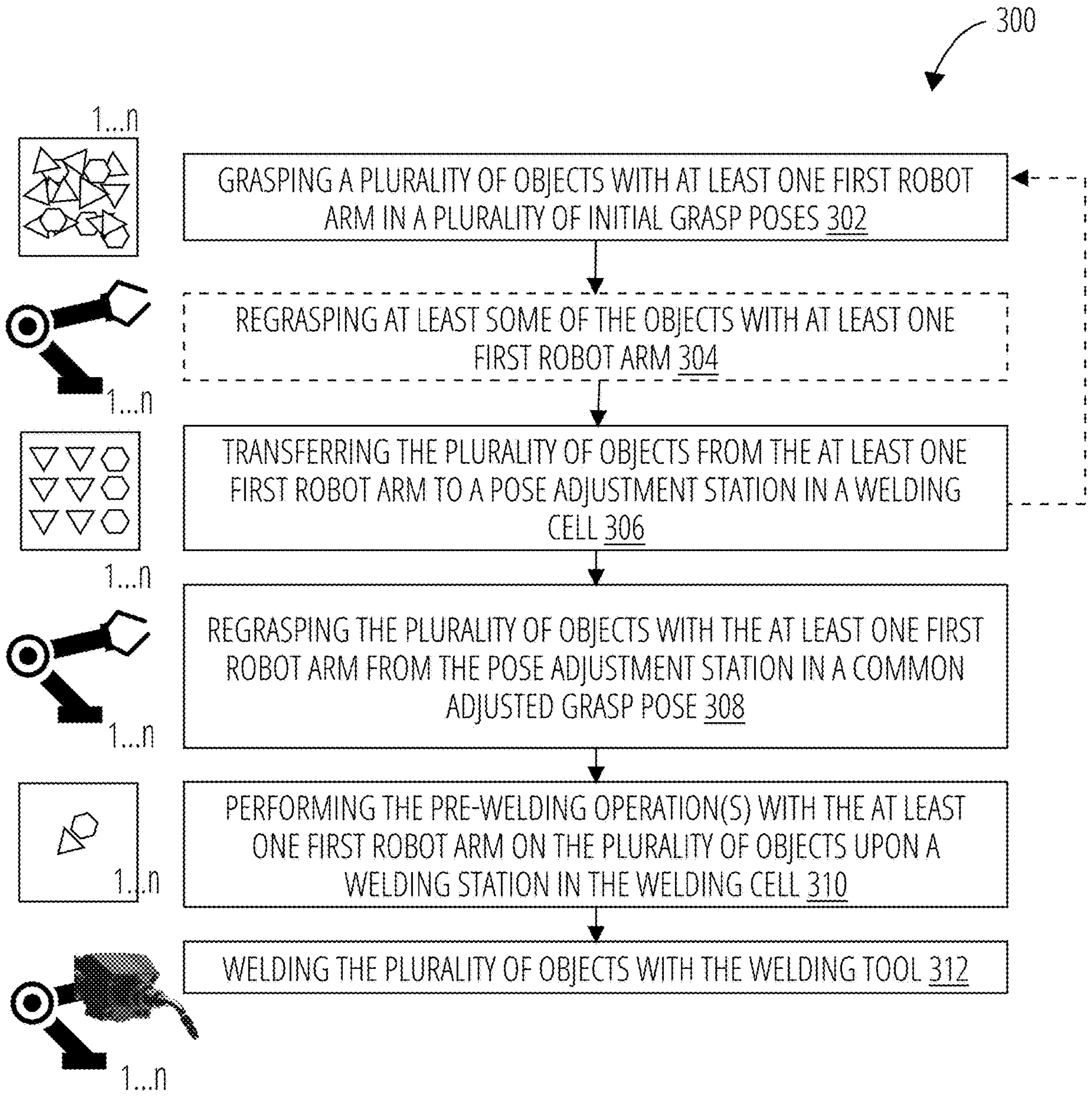
FIG. 3A illustrates steps in robotic welding methods according to the present disclosure which may be implemented by the modules of FIG. 2.

FIG. 3A schematically illustrates representative robotic welding methods 300, where FIG. 3B-FIG. 3E represent exemplary methods of FIG. 3A. For understanding, steps are described in relation to a robotic welding system having 1 . . . n differently-characterized objects (e.g., different geometries), 1 . . . n grasping robots, 1 . . . n pose adjustment stations, 1 . . . n welding robots, and 1 . . . n welding stations. Each robot arm generally acts on one object at a time, except for welding robots, which may weld a plurality of objects (e.g., simultaneously) as part of an assembly. In any block, where a plurality of robot arms are utilized, the robot arms may operate sequentially or in parallel to maximize throughput.

Block 302 may include any combination of features described with respect to module 202. At block 302, a plurality of objects are grasped (e.g., from storage) with 1 . . . n robot arms in a plurality of different initial grasp poses, as described above with respect to module 202. The objects may be alike or may have different geometries. As previously described, due to variations in location, orientation, and (potentially) geometry of objects in the storage, this step relates to a highly unstructured environment. Each robot arm may grasp each object one at a time, i.e., sequentially. If the objects include different types of objects (e.g., different geometries), then each robot arm may optionally be tasked with grasping a particular type of object.

Blocks 304, 306 may include any combination of features described with respect to module 204. Optional block 304 may include any combination of features described with respect to module 228. At block 304, one or more objects of the plurality of objects are regrasped by one or more of the 1 . . . n robot arms in a different pose prior to placement in intermediate resting pose(s) on the pose adjustment station. This may occur, for example, in a minority of the objects which cannot be grasped from storage in an initial grasp pose that enables successful placement on the pose adjustment station in the desired intermediate resting pose. Accordingly, block 304 enables a higher success rate for the plurality of objects. For example, the robot arm that grasps an object in the initial grasp pose may temporarily park that object on a static grasper or other robot arm in the welding cell, release the object, and regrasp the object in a pose the enables placement of the object on the pose adjustment station in the desired intermediate resting pose.

Block 306 may include any combination of features described with respect to module 226. At block 306, the plurality of objects are placed by the 1 . . . n robot arms on one or more pose adjustment stations in one or more intermediate resting poses determined to enable regrasping in one or more adjusted grasp poses. Alike objects may be placed in a common intermediate resting pose, e.g., on a dedicated pose adjustment station or a dedicated area of a pose adjustment station shared amongst objects of different types. Different types of objects (e.g., objects having different geometries) may be placed in different intermediate resting poses that enable corresponding adjusted grasp poses. Following block 306, alike objects are placed on the pose adjustment station in a common intermediate resting pose, i.e., in a relatively structured state as compared to block 302.

Blocks 302-306 may be performed in parallel with the performance of blocks 308, 310, and/or 312 in order to create a queue of objects on the pose adjustment station in order to maximize throughput. Specifically, 1 . . . n robot arms execute blocks 302-306, thereby placing alike objects on the pose adjustment station in an alike intermediate resting pose (relative to the grasping tool), which enable efficient regrasping of the alike objects in a common adjusted grasp pose and transference to the welding station. In embodiments comprising different types of objects, the 1 . . . n robot arms place each type of object in a corresponding intermediate resting pose on the pose adjustment station(s).

Block 308 may include any combination of features described with respect to module 206. At block 308, the plurality of objects are regrasped in 1 . . . n adjusted grasp poses by 1 . . . n robot arms, which may be the same or different from the 1 . . . n robot arms employed with respect to blocks 302-306. To maintain a relatively structured state, the number of adjusted grasp poses may correspond to the number of different types of objects and/or the number of different types of pre-welding operations. For example, a first robot arm may regrasp a first type of alike objects in a first common adjusted grasp pose that enables a first downstream pre-welding operation (e.g., placement, insertion, and/or alignment task), and a second robot arm may regrasp a second type of alike objects in a second common adjusted grasp pose that enables a second downstream pre-welding operation (e.g., alignment with one of the first objects). Following block 308, the objects are ready for transference to the welding station. In some embodiments, block 308 includes the 1 . . . n robot arms transferring the objects to the welding station.

Blocks 310, 312 may include any combination of features described with respect to module 208. At block 310, the 1 . . . n robot arms transfer the objects (grasped in the respective adjusted grasp poses) to 1 . . . n welding stations and 1 . . . n pre-welding operations are performed on each object (e.g., placement on a welding fixture, alignment and/or insertion with an assembly). In some embodiments, the same robot arm that transfers an object to the welding station performs the pre-welding operation, wherein the same or different 1 . . . n robot arms perform one or more pre-welding operations on each object.

At block 312 1 . . . n welding robot arms weld each object in the welding station following the pre-welding operation(s) for that object, for example after the object is fixtured in relation to another object and/or an assembly and forms an unwelded seam. Block 312 may include additional pre-welding operations including scanning, calibration, and/or registration steps to ensure accurate localization of the seam(s) to be welded. In some embodiments, a plurality of welding robots contemporaneously weld a single object or assembly, e.g., when the unwelded seam is particularly long and/or the assembly includes a plurality of seams to be welded. After completion of the welding operation(s) on each object, the welded object/assembly may be transferred by a robot arm to a separate storage.

FIG. 3B schematically illustrates specific representative robotic welding methods 300 of the general methods of FIG. 3A. According to FIG. 3B, the robotic welding methods 300 are performed by a robotic welding system comprising a single grasping robot, a single welding robot, and a storage containing a single type of object. In other embodiments, the same robotic welding system could perform the following operations in the context of a storage containing a plurality of different types of objects (e.g., a plurality of first objects having a first common geometry and a plurality of second objects having a different second common geometry).

At block 302, the grasping robot grasps an object (e.g., one object) from the storage in an initial grasp pose (the initial grasp pose will differ for each object). At optional block 304, the grasping robot regrasps the object prior to placement on the pose adjustment station, e.g., by parking the object on a static grasper or preliminary pose adjustment station, releasing, and regrasping the object in a pose that enables placement of the object on the pose adjustment station in the desired intermediate resting pose. At block 306, the grasping robot transfers the object to the pose adjustment station and releases the object in the intermediate resting pose. At block 308, the grasping robot regrasps the object from intermediate resting pose in the adjusted grasp pose, which is determined to enable downstream pre-welding operations. The adjusted grasp pose may be provided or determined by the robotic welding system (e.g., determined once for a given object type and utilized over and over). The grasping robot transfers the object to the welding station at either block 308 or 310. At block 310, the grasping robot performs one or more pre-welding operations on the object, for example placing the object upon a welding fixture, aligning the object relative to a workpiece (e.g., to create a seam), and/or inserting the object into another object to create an assembly. Thereafter, the welding fixtures may autonomously secure the object to the welding station. At block 312, the welding robot welds the assembly, and more particularly, a seam formed at least in part by the object. Contemporaneously with the performance of block 312 by the welding robot, the grasping robot may contemporaneously perform one or more of blocks 302-310 in order to prepare another object for welding. After welding, the completed assembly is autonomously transferred to storage, e.g., by the grasping robot.

FIG. 3C schematically illustrates additional specific representative robotic welding methods 300 of the general methods of FIG. 3A. According to FIG. 3C, the robotic welding methods 300 are performed by a robotic welding system comprising a plurality of grasping robots (e.g., a rear grasping robot and a forward grasping robot) and a single welding robot, in the context of a storage containing a single type of object. At block 302, the rear grasping robot grasps an object (e.g., one object) from the storage in an initial grasp pose (the initial grasp pose will differ for each object). At optional block 304, the rear grasping robot regrasps the object prior to placement on the pose adjustment station, e.g., by parking the object on a static grasper or preliminary pose adjustment station, releasing, and regrasping the object in a pose that enables placement of the object on the pose adjustment station in the desired intermediate resting pose. At block 306, the rear grasping robot transfers the object to the pose adjustment station and releases the object in the intermediate resting pose. Following block 306, the rear grasping robot repeats blocks 302-306 contemporaneously with performance of blocks 308-312. At block 308, the forward grasping robot regrasps the object from intermediate resting pose in the adjusted grasp pose, which is determined to enable downstream pre-welding operations. The adjusted grasp pose may be provided or determined by the robotic welding system (e.g., determined once for a given object type and utilized over and over). The forward grasping robot transfers the object to the welding station at either block 308 or 310. At block 310, the forward grasping robot performs one or more pre-welding operations on the object, for example placing the object upon a welding fixture, aligning the object relative to a workpiece (e.g., to create a seam), and/or inserting the object into another object to create an assembly. Thereafter, the welding fixtures may autonomously secure the object to the welding station. Following block 310, the forward grasping robot may repeat all or part of blocks 308-310 contemporaneously with the performance of block 312. At block 312, the welding robot welds the assembly, and more particularly, a seam formed at least in part by the object. Contemporaneously with the performance of block 312 by the welding robot, the rear and forward grasping robots may contemporaneously perform one or more of blocks 302-310 in order to prepare additional objects for welding. After welding, the completed assembly is autonomously transferred to storage, e.g., by the forward grasping robot.

FIG. 3D schematically illustrates additional specific representative robotic welding methods 300 of the general methods of FIG. 3A. According to FIG. 3D, the robotic welding methods 300 are performed by a robotic welding system comprising a plurality of grasping robots (e.g., two forward grasping robots and one forward grasping robot) and two welding robots, in the context of a storage containing two types of objects. At block 302, the first rear grasping robot grasps objects of the first type from the storage in an initial grasp pose. Similarly, the second rear grasping robot grasps objects of the second type from storage in an initial grasp pose. The initial grasp poses will differ for all of the objects in the bin. At optional block 304, the first rear grasping robot regrasps certain objects of the first type prior to placement on the pose adjustment station, e.g., by parking the object on a static grasper or preliminary pose adjustment station, releasing, and regrasping the object in a pose that enables placement of the object on the pose adjustment station in a first desired intermediate resting pose. Similarly, the second rear grasping robot regrasps certain objects of the second type prior to placement on the pose adjustment station in a (different) second desired intermediate resting pose. The intermediate resting poses may be provided or determined by the robotic welding system (e.g., determined once for each of the first and second object types and utilized over and over). At block 306, the first rear grasping robot transfers the first objects to the pose adjustment station and releases the first objects in the first intermediate resting pose. Similarly, the second rear grasping robot transfers the second objects to the pose adjustment station and releases the second objects in the second intermediate resting pose. Following block 306, the rear grasping robots repeat blocks 302-306 contemporaneously with performance of blocks 308-312. At block 308, the forward grasping robot regrasps the first and second object types from the respective intermediate resting poses in respective adjusted grasp poses, which are determined to enable downstream pre-welding operations. The adjusted grasp poses may be provided or determined by the robotic welding system (e.g., determined once for each of the first and second object types and utilized over and over). The forward grasping robot transfers the first and second object types to the welding station at either block 308 or 310. At block 310, the forward grasping robot performs one or more pre-welding operations on the first and second object types, for example placing one of the first object types upon a welding fixture and placing one of the second object types upon another welding fixture relative to the first object type, forming a precise seam therebetween. Thereafter, the welding fixtures may autonomously secure the first and second object types to the welding station. The first and second object types may for part of an assembly, each assembly comprising at least one of each of the first and second object types. Following block 310, the forward grasping robot may repeat all or part of blocks 308-310 contemporaneously with the performance of block 312. At block 312, the welding robots weld the assembly, and more particularly, one or more seams formed at least in part by the first and/or second object types. The welding robots may weld a same seam contemporaneously or different seams. Contemporaneously with the performance of block 312 by the welding robot, the rear and forward grasping robots may contemporaneously perform one or more of blocks 302-310 in order to prepare additional objects for welding. After welding, the completed assembly is autonomously transferred to storage, e.g., by the forward grasping robot.

FIG. 3E schematically illustrates additional specific representative robotic welding methods 300 of the general methods of FIG. 3A. According to FIG. 3E, the robotic welding methods 300 are performed by a robotic welding system comprising a plurality of grasping robots (e.g., two forward grasping robots and two forward grasping robots), two welding robots, two pose adjustment stations, and a storage containing two types of objects. The robotic welding methods 300 of FIG. 3E are performed the same as in FIG. 3D, except that each of the object types is placed on a dedicated pose adjustment station, which may be disposed in a same or different location in the welding cell. Additionally, each of the two forward grasping robots acts on one of the object types, regrasping the corresponding object types in the respective adjusted grasp pose, transferring to the welding station, and performing one or more pre-welding operations on the respective object type.

As illustrated and described with respect to FIG. 3B-FIG. 3E, the robotic welding methods 300 of FIG. 3A may be practiced in many different robotic welding system configurations, including additional configurations not expressly depicted in FIG. 3B-FIG. 3E. For example, the methods may be practiced by robotic welding systems having a greater number of grasping robots, a greater number of welding robots, a greater number of different types of objects, and a greater number of pose adjustment stations. For example, the methods may be practiced by robotic welding systems having n different types of objects, at least n different grasping robots (e.g., each corresponding to one of the types of objects), and optionally n different welding robots.

Accordingly, the present disclosure provides robotic welding systems and robotic welding methods that reduce welding cycle time by utilizing an intermediate pose adjustment station upon which a robot arm releases and regrasps an object in an adjusted grasp pose determined to facilitate downstream pre-welding operations. Counterintuitively, adding a station to the automated welding process shortens overall cycle time because operations between the pose adjustment station and welding station are relatively structured and highly repeatable with significantly fewer computing resources than would be required to compute an entire path from storage to the welding station for every object in storage.

In view of the foregoing, various inventive aspects disclosed herein may be characterized and claimed according to the following clauses:

1. A robotic welding system, comprising: at least one first robot arm positioned in a welding cell; a second robot arm positioned in the welding cell and coupled to a welding tool; a pose adjustment station disposed in the welding cell; a welding station disposed in the welding cell; and a controller operably coupled to the at least one first robot arm and the at least one second robot arm, the controller comprising a processor and a memory storing instructions, which when executed by the processor, cause the robotic welding system to perform operations including: grasping a plurality of objects with the at least one first robot arm in a plurality of initial grasp poses; transferring the plurality of objects with the at least one first robot arm to the pose adjustment station; regrasping the plurality of objects with the at least one first robot arm from the pose adjustment station in a common adjusted grasp pose; performing at least one pre-welding operation with the at least one first robot arm on the plurality of objects upon the welding station; and welding the plurality of objects with the welding tool.

2. The robotic welding system of any clause herein, wherein transferring the plurality of objects with the at least one first robot arm to the pose adjustment station comprises placing the plurality of objects on the pose adjustment station in a common intermediate resting pose.

3. The robotic welding system of any clause herein, wherein placing the plurality of objects on the pose adjustment station in a common intermediate resting pose comprises placing the plurality of objects on at least one pose adjustment fixture.

4. The robotic welding system of any clause herein, wherein performing the at least one pre-welding operation comprises performing the at least one pre-welding operation relative to at least one welding fixture.

5. The robotic welding system of any clause herein, wherein regrasping the plurality of objects with the at least one first robot arm from the pose adjustment station comprises regrasping the plurality of objects from a queue of objects on the pose adjustment station.

6. The robotic welding system of any clause herein, wherein each object in the queue of objects has a common intermediate resting pose.

7. The robotic welding system of any clause herein, wherein the at least one pre-welding operation comprises placing the plurality of objects on the welding station, wherein the adjusted grasp pose enables placement of a placement surface of the plurality of objects on the welding station.

8. The robotic welding system of any clause herein, wherein the at least one pre-welding operation comprises placing the plurality of objects on at least one welding fixture of the welding station.

9. The robotic welding system of any clause herein, wherein the at least one pre-welding operation comprises aligning the plurality of objects with one or more reference objects on the welding station.

10. The robotic welding system of any clause herein, wherein the at least one pre-welding operation comprises inserting the plurality of objects into one or more receiving objects on the welding station.

11. The robotic welding system of any clause herein, wherein the adjusted grasp pose does not grasp an insertion end of any object of the plurality of objects.

12. The robotic welding system of any clause herein, the operations further comprising regrasping the plurality of objects with the at least one first robot arm prior to transferring the plurality of objects to the pose adjustment station.

13. The robotic welding system of any clause herein, wherein regrasping the plurality of objects with the at least one first robot arm prior to transferring the plurality of objects to the pose adjustment station comprises releasing the plurality of objects on a preliminary pose adjustment station.

14. The robotic welding system of any clause herein, wherein the at least one first robot arm comprises a first grasping robot and a second grasping robot, wherein the first grasping robot grasps the plurality of objects in the plurality of initial grasp poses and transfers the plurality of objects to the pose adjustment station, wherein the second grasping robot regrasps the plurality of objects in the common adjusted grasp pose and performs the at least one pre-welding operation.

15. The robotic welding system of any clause herein, wherein the plurality of objects comprises a plurality of first objects having a first common geometry and a plurality of second objects having a different second common geometry, wherein grasping the plurality of objects with the at least one first robot arm comprises grasping the plurality of first objects and the plurality of second objects, wherein transferring the plurality of objects with the at least one first robot arm to the pose adjustment station comprises transferring the plurality of first objects and the plurality of second objects to the pose adjustment station, wherein regrasping the plurality of objects with the at least one first robot arm from the pose adjustment station comprises regrasping the plurality of first objects in a first common adjusted grasp pose and regrasping the plurality of second objects in a different second common adjusted grasp pose, wherein performing the pre-welding operation with the at least one first robot arm on the plurality of objects comprises performing a first pre-welding operation on the plurality of first objects and performing a different type of second pre-welding operation upon the plurality of second objects, and wherein welding the plurality of objects with the welding tool comprises welding a plurality of assemblies, each assembly comprising at least one of each of the plurality of first objects and the plurality of second objects.

16. The robotic welding system of any clause herein, wherein transferring the plurality of objects with the at least one first robot arm to the pose adjustment station comprises placing the plurality of first objects on the pose adjustment station in a first common intermediate resting pose and placing the second objects on the pose adjustment station in a different second common intermediate resting pose.

17. The robotic welding system of any clause herein, wherein the at least one first robot arm comprises a first robot arm and a second robot arm, wherein the plurality of objects comprises a plurality of first objects having a first common geometry and a plurality of second objects having a different second common geometry, wherein the first robot arm grasps and transfers the plurality of first objects to the pose adjustment station, wherein the second robot arm grasps and transfers the plurality of second objects to the pose adjustment station.

18. The robotic welding system of any clause herein, wherein the first robot arm places the plurality of first objects on the pose adjustment station in a first intermediate resting pose, wherein the second robot arm places the plurality of second objects on the pose adjustment station in a different second intermediate resting pose.

19. A controller for any robotic welding system herein, wherein the controller is operably coupled to at least one first robot arm and at least one second robot arm of a robotic welding system, the at least one first robot arm and the at least one second robot arm being disposed in a welding cell, the controller comprising: a processor and a memory storing instructions, which when executed by the processor, cause the robotic welding system to perform operations including: grasping a plurality of objects with the at least one first robot arm in a plurality of initial grasp poses; transferring the plurality of objects with the at least one first robot arm to a pose adjustment station in the welding cell; regrasping the plurality of objects with the at least one first robot arm from the pose adjustment station in a common adjusted grasp pose configured to enable a pre-welding operation; performing the pre-welding operation with the at least one first robot arm on the plurality of objects upon a welding station in the welding cell; and welding the plurality of objects with a welding tool.

20. A robotic welding method optionally including the features of any clause herein, comprising: grasping a plurality of objects with at least one first robot arm in a plurality of initial grasp poses; transferring the plurality of objects with the at least one first robot arm to a pose adjustment station disposed in a welding cell; regrasping the plurality of objects with the at least one first robot arm from the pose adjustment station in a common adjusted grasp pose configured to enable a pre-welding operation; performing the pre-welding operation with the at least one first robot arm on the plurality of objects upon a welding station in the welding cell; and welding the plurality of objects with a welding tool.

21. A robotic welding system optionally including the features of any clause herein, comprising: at least one first robot arm positioned in a welding cell; a second robot arm positioned in the welding cell and coupled to a welding tool; a pose adjustment station disposed in the welding cell; a welding station disposed in the welding cell; and a controller operably coupled to the at least one first robot arm and the at least one second robot arm, the controller comprising a processor and a memory storing instructions, which when executed by the processor, cause the robotic welding system to perform operations including: grasping a plurality of first objects and a plurality of second objects; transferring the plurality of first objects and the plurality of second objects to the pose adjustment station; regrasping, upon the pose adjustment station, the plurality of first objects in a first common adjusted grasp pose configured to enable a first pre-welding operation, and regrasping the plurality of second objects in a second common adjusted grasp pose configured to enable a second pre-welding operation; performing, upon the welding station, a first pre-welding operation on the plurality of first objects and performing a second pre-welding operation upon the plurality of second objects, and welding, with the welding tool, a plurality of assemblies, each assembly comprising at least one of each of the plurality of first objects and the plurality of second objects.

22. A robotic welding method optionally including the features of any clause herein, comprising: grasping a plurality of first objects and a plurality of second objects with at least one first robot arm; transferring, with the at least one first robot arm, the plurality of first objects and the plurality of second objects to a pose adjustment station disposed in a welding cell; regrasping, with the at least one first robot arm and upon the pose adjustment station, the plurality of first objects in a first common adjusted grasp pose configured to enable a first pre-welding operation, and the plurality of second objects in a second common adjusted grasp pose configured to enable a second pre-welding operation; performing, upon the welding station, a first pre-welding operation on the plurality of first objects and performing a second pre-welding operation upon the plurality of second objects; and welding, with a welding tool coupled to a second robot arm, a plurality of assemblies, each assembly comprising at least one of each of the plurality of first objects and the plurality of second objects.

Various changes can be made to the embodiments of the present disclosure as could be reasonably contemplated in view of the above-described description by any person skilled in the art. The following claims are presented as examples of embodiments of the present disclosure, but these claims should not be construed to limit other claims or other embodiments disclosed herein.

The detailed description set forth above in connection with the appended drawings, where like numerals reference like elements, are intended as a description of representative embodiments of the present disclosure and are not intended to represent the only embodiments. Each embodiment described m this disclosure is provided as an example or illustration and should not be construed as preferred or advantageous over other embodiments. The illustrative embodiments provided herein are not intended to be exhaustive or to limit the disclosure to the precise forms disclosed. Similarly, any steps described herein may be interchangeable with other steps, or combinations of steps, in order to achieve the same or substantially similar result. Further still, one or more features of any embodiment may be combined with one or more features of one or more embodiments to form additional embodiments, which are within the scope of the present disclosure.

Generally, the embodiments disclosed herein are non-limiting, and the inventors contemplate that other embodiments within the scope of this disclosure may include structures and functionalities from more than one specific embodiment shown in the FIGURES and described in the specification. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed. For example, the present disclosure includes additional embodiments having combinations of any one or more features described above with respect to the representative embodiments.

In the foregoing description, specific details are set forth to provide a thorough understanding of representative embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure.

The present application may include references to directions, such as "first," "second," "vertical," "horizontal," "front," "rear," "left," "right," "top," and "bottom," "below," "around," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" means any number that is more than one, for example, two, three, four, five, etc. The term "about," "approximately," etc., means plus or minus 5% of the stated value. The term "based upon" means "based at least partially upon." The term "between" includes the values recited in connection therewith. The expressions "at least one of A, B, or C"; "at least one of A, B, and C"; and "at least one of A, B, and/or C" have the same meaning, i.e., any one of the following conditions satisfy all of the foregoing expressions: A; B; C; AB; AC; BC; ABC.

Memory of a computing device is also referred to as a non-transitory computer-readable medium, which can include instructions or computer code for performing various computer-implemented operations. The computer-readable medium is non-transitory, i.e., does not include transitory propagating signals per se (e.g., a propagating electromagnetic wave carrying information on a transmission medium such as space or a cable). Examples of non-transitory computer-readable media include, but are not limited to: magnetic storage media such as hard disks; optical storage media such as Compact Disc/Digital Video Discs (CD/DVDs), Compact Disc-Read Only Memories (CD-ROMs), and holographic devices; magneto-optical storage media such as optical disks; carrier wave signal processing modules, Read-Only Memory (ROM), Random-Access Memory (RAM) and/or the like. One or more processors can be communicatively coupled to the memory and operable to execute the code stored on the non-transitory processor-readable medium. Examples of processors include general purpose processors (e.g., CPUs), Graphical Processing Units, Field Programmable Gate Arrays (FPGAs), Application Specific Integrated Circuits (ASICs), Digital Signal Processor (DSPs), Programmable Logic Devices (PLDs), and the like. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The invention claimed is:

1. A robotic manufacturing system, comprising:
- at least one first robot arm positioned in a manufacturing cell;
- a second robot arm positioned in the manufacturing cell and coupled to a manufacturing tool;
- an unstructured object storage area;
- a pose adjustment station disposed in the manufacturing cell;
- a manufacturing station disposed in the manufacturing cell; and
- a controller operably coupled to the at least one first robot arm and the at least one second robot arm, the controller comprising a processor and a memory storing instructions, which when executed by the processor, cause the robotic manufacturing system to perform operations including:
  - grasping a plurality of objects from the unstructured object storage area with the at least one first robot arm in a plurality of different initial grasp poses;
  - determining a common intermediate resting pose with a pose estimation network trained, based upon a dataset comprising feasible and infeasible intermediate resting poses, to generate the common intermediate resting pose based on a common adjusted grasp pose;
  - placing the plurality of objects with the at least one first robot arm on the pose adjustment station in the common intermediate resting pose;
  - regrasping the plurality of objects with the at least one first robot arm from the pose adjustment station in the common adjusted grasp pose;
  - performing at least one preparatory operation with the at least one first robot arm on the plurality of objects relative to the manufacturing station while or after at least one of the plurality of objects is grasped in the common adjusted grasp pose; and
  - performing a manufacturing operation on the plurality of objects with the manufacturing tool.

2. The robotic manufacturing system of claim 1, wherein the common intermediate resting pose is a gravitationally stable pose of the plurality of objects on the pose adjustment station in which the at least one first robot arm is able to regrasp the plurality of objects in the common adjusted grasp pose.

3. The robotic manufacturing system of claim 1, wherein performing the at least one preparatory operation comprises performing the at least one preparatory operation relative to at least one fixture.

4. The robotic manufacturing system of claim 1, further comprising at least one pose adjustment fixture disposed on the pose adjustment station and having a configuration based on the common adjusted grasp pose, wherein the plurality of objects are placed in the common intermediate resting pose relative to the at least one pose adjustment fixture.

5. The robotic manufacturing system of claim 1, wherein the plurality of different initial grasp poses are determined by a grasp candidate network operably coupled to the controller, the grasp candidate network trained with a second dataset comprising representations of stable and unstable grasp poses.

6. The robotic manufacturing system of claim 1, wherein the at least one preparatory operation comprises placing the plurality of objects on the manufacturing station, wherein the common adjusted grasp pose enables placement of a placement surface of the plurality of objects on the manufacturing station.

7. The robotic manufacturing system of claim 6, wherein the at least one preparatory operation comprises placing the plurality of objects on at least one fixture of the manufacturing station.

8. The robotic manufacturing system of claim 1, wherein the at least one preparatory operation comprises aligning the plurality of objects with one or more reference objects on the manufacturing station.

9. The robotic manufacturing system of claim 1, wherein the at least one preparatory operation comprises inserting the plurality of objects into one or more receiving objects on the manufacturing station.

10. The robotic manufacturing system of claim 9, wherein the common adjusted grasp pose does not grasp an insertion end of any object of the plurality of objects.

11. The robotic manufacturing system of claim 1, the operations further comprising regrasping the plurality of objects with the at least one first robot arm prior to transferring the plurality of objects to the pose adjustment station.

12. The robotic manufacturing system of claim 11, wherein regrasping the plurality of objects with the at least one first robot arm prior to transferring the plurality of objects to the pose adjustment station comprises releasing the plurality of objects on a preliminary pose adjustment station.

13. The robotic manufacturing system of claim 1,
wherein the at least one first robot arm comprises a first grasping robot and a second grasping robot,
wherein the first grasping robot grasps the plurality of objects in the plurality of initial grasp poses and transfers the plurality of objects to the pose adjustment station,
wherein the second grasping robot regrasps the plurality of objects in the common adjusted grasp pose and performs the at least one preparatory operation.

14. The robotic manufacturing system of claim 1, wherein the manufacturing cell comprises a welding cell, the manufacturing station comprises a welding station, the manufacturing tool comprises a welding tool, the at least one preparatory operation comprises at least one of placement, alignment, insertion, or fit-up of the plurality of objects relative to a welding fixture or a workpiece, and the performing the manufacturing operation on the plurality of objects with the manufacturing tool comprises welding the plurality of objects with the welding tool.

15. A robotic manufacturing system, comprising:
at least one first robot arm positioned in a manufacturing cell;
at least one second robot arm positioned in the manufacturing cell and coupled to a manufacturing tool;
an unstructured object storage area;
a pose adjustment station disposed in the manufacturing cell;
a manufacturing station disposed in the manufacturing cell; and
a controller operably coupled to the at least one first robot arm and the at least one second robot arm, the controller comprising a processor and a memory storing instructions, which when executed by the processor, cause the robotic manufacturing system to perform operations including:
grasping a plurality of first objects and a plurality of second objects from the unstructured object storage area with the at least one first robot arm in a plurality of different initial grasp poses, wherein the plurality of first objects has a first common geometry and the plurality of second objects has a second common geometry;
placing, with the at least one first robot arm, the plurality of first objects on the pose adjustment station in a first common intermediate resting pose and placing the second objects on the pose adjustment station in a different second common intermediate resting pose, wherein the first common intermediate resting pose and the second common intermediate resting pose are determined by a pose estimation model trained using a resting pose dataset to generate intermediate resting poses based on downstream adjusted grasp poses;
regrasping, with the at least one first robot arm from the pose adjustment table station, the plurality of first objects in a first common adjusted grasp pose and the plurality of second objects in a different second common adjusted grasp pose;
performing, with the at least one first robot arm, a first preparatory operation on the plurality of first objects while or after at least one of the plurality of first objects is grasped in the first common adjusted grasp pose and a different type of second preparatory operation upon the plurality of second objects while or after at least one of the plurality of second objects is grasped in the second common adjusted grasp pose; and
performing, with the manufacturing tool, a manufacturing operation on a plurality of assemblies, each assembly comprising at least one of the first objects and at least one of the second objects.

16. The robotic manufacturing system of claim 15, wherein the first common intermediate resting pose is determined by the pose estimation model based upon at least one constraint of the first common adjusted grasp pose and the second common intermediate resting pose is determined by the pose estimation model based upon at least one constraint of the second common adjusted grasp pose.

17. A robotic manufacturing method, comprising:
grasping a plurality of objects from an unstructured object storage area with at least one first robot arm in a plurality of different initial grasp poses;
determining a common intermediate resting pose with a pose estimation network trained to generate intermediate resting poses based upon at least one of a feasibility constraint or a collision constraint of a downstream common adjusted regrasp pose;
placing the plurality of objects with the at least one first robot arm on a pose adjustment station disposed in a manufacturing cell in the common intermediate resting pose;
regrasping the plurality of objects with the at least one first robot arm from the pose adjustment station in the downstream common adjusted regrasp pose;
performing a preparatory operation with the at least one first robot arm on the plurality of objects relative to a manufacturing station in the manufacturing cell while or after at least one of the plurality of objects is regrasped in the downstream common adjusted regrasp pose; and
performing a manufacturing operation on the plurality of objects with a manufacturing tool.

18. The robotic manufacturing method of claim 17, wherein the manufacturing cell comprises a welding cell, the manufacturing station comprises a welding station, the manufacturing tool comprises a welding tool, the preparatory operation comprises at least one of placement, alignment, insertion, or fit-up of the plurality of objects relative to a welding fixture or a workpiece, and the manufacturing operation comprises welding the plurality of objects with the welding tool.

19. The robotic manufacturing method of claim 17, wherein the preparatory operation is performed while the at least one of the plurality of objects is regrasped in the downstream common adjusted regrasp pose.

20. The robotic manufacturing method of claim 17, wherein the regrasping comprises regrasping the plurality of objects with a second robot arm of the at least one first robot arm from the pose adjustment station in the downstream common adjusted regrasp pose.

* * * * *